(12) United States Patent
Alexander-Katz et al.

(10) Patent No.: US 12,454,501 B2
(45) Date of Patent: Oct. 28, 2025

(54) EVOLVING RANDOM HETEROPOLYMERS TOWARDS CATALYTICALLY ACTIVE MATERIALS

(71) Applicants: MASSACHUSETTS INSTITUTE OF TECHNOLOGY, Cambridge, MA (US); THE REGENTS OF THE UNIVERSITY OF CALIFORNIA, Oakland, CA (US)

(72) Inventors: Alfredo Alexander-Katz, Cambridge, MA (US); Shayna Hilburg, Cambridge, MA (US); Ting Xu, Berkeley, CA (US); Hao Yu, Emeryville, CA (US); Stefan Marco Eres, Berkeley, CA (US); Philjun Kang, Pleasanton, CA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 18/720,968

(22) PCT Filed: Oct. 6, 2023

(86) PCT No.: PCT/US2023/076277
§ 371 (c)(1),
(2) Date: Jun. 17, 2024

(87) PCT Pub. No.: WO2024/123469
PCT Pub. Date: Jun. 13, 2024

(65) Prior Publication Data
US 2024/0417352 A1   Dec. 19, 2024

Related U.S. Application Data

(60) Provisional application No. 63/430,902, filed on Dec. 7, 2022.

(51) Int. Cl.
*C07C 29/14* (2006.01)
*B01J 31/06* (2006.01)
(Continued)

(52) U.S. Cl.
CPC ............... *C07C 29/14* (2013.01); *B01J 31/06* (2013.01); *C08F 220/14* (2013.01);
(Continued)

(58) Field of Classification Search
CPC ........ C07C 29/14; B01J 31/06; C08F 220/14; C08F 220/1808
See application file for complete search history.

(56) References Cited

U.S. PATENT DOCUMENTS

2020/0318154 A1   10/2020   Xu et al.

FOREIGN PATENT DOCUMENTS

JP   2003326172 A   11/2003
WO   2024123469 A2   6/2024

OTHER PUBLICATIONS

Case, D.A. et al., "AmberTools2019," University of California, San Francisco (2019). (Year: 2019).*
(Continued)

*Primary Examiner* — Catherine S Branch
(74) *Attorney, Agent, or Firm* — Barnes & Thornburg LLP

(57) ABSTRACT

The present disclosure relates to using monomer-based heteropolymers to create random heteropolymers that act as biomimetic catalysts that can be evolved to mimic activities of different classes of natural enzymes. The random heteropolymers comprise a mixture of heteropolymer sequences wherein a portion of the heteropolymers comprise a catalytically active region similar to that of a naturally occurring enzyme active site.

19 Claims, 12 Drawing Sheets

(51) Int. Cl.
C08F 220/14 (2006.01)
C08F 220/18 (2006.01)

(52) U.S. Cl.
CPC ..... *C08F 220/1808* (2020.02); *B01J 2231/12* (2013.01); *B01J 2231/4288* (2013.01); *B01J 2231/62* (2013.01); *B01J 2231/70* (2013.01)

(56) References Cited

OTHER PUBLICATIONS

PCT International Search Report and Written Opinion completed by the ISA/US on May 14, 2024 and issued in connection with PCT/US2023/076277.
Han. "Forced Unfolding of Protein-Inspired Single-Chain Random Heleropolymers" 10.1021/acs.macromol.1 c02411. Macromolecules. Feb. 2, 2022; abstract; figure 7.
Hilburg. "Behavior of Protein-Inspired Synthetic Random Heleropolymers", 10.1021/acs.macromol.Oc01886. Macromolecules. Oct. 22, 2020; abstract; figure 2; p. 3, col. 2, paragraph 6.
Huurne. "Supramolecular Single-Chain Polymeric Nanoparticles" 10.31635/ccschem.019.20180036. CCS Chemistry. Apr. 1, 2019; abstract; p. 73, col. 1, paragraph 2.
Jayapurna. "Sequence Design of Random Heteropolymers as Protein Mimics" 652-660. Biomacromolecules. Jan. 13, 2023; Entire Document; DOI: 10.1021/acs.biomac.2c01036.
Hilburg, et al., Substrate Interactions in Catalytic Random Heteropolymers.
Dobrynin, A. V.; Rubinstein, M. Hydrophobically modified polyelectrolytes in dilute salt-free solutions. Macromolecules 2000, 33 (21), 8097-8105.
Carrillo, J.-M. Y.; Dobrynin, A. V. Polyelectrolytes in Salt Solutions: Molecular Dynamics Simulations. Macromolecules 2011, 44 (14), 5798-5816.
Domingos, S. R.; Pérez, C.; Medcraft, C.; Pinacho, P.; Schnell, M. Flexibility unleashed in acyclic monoterpenes: Conformational space of citronellal revealed by broadband rotational spectroscopy. Phys. Chem. Chem. Phys. 2016, 18 (25), 16682-16689.
Larion, M.; Miller, B.; Brüschweiler, R. Conformational heterogeneity and intrinsic disorder in enzyme regulation: Glucokinase as a case study. Intrinsically Disord. Proteins 2015, 3 (1), e1011008.
Palombo, M.; Bonucci, A.; Etienne, E.; Ciurli, S.; Uversky, V. N.; Guigliarelli, B.; Belle, V.; Mileo, E.; Zambelli, B. The relationship between folding and activity in UreG, an intrinsically disordered enzyme. Sci. Rep. 2017, 7 (1), 1-10.
Eisenreich, F.; Meijer, E. W.; Palmans, A. R. A. Amphiphilic Polymeric Nanoparticles for Photoredox Catalysis in Water. Chem.—A Eur. J. 2020, 26 (45), 10355-10361.
Verde-Sesto, E.; Arbe, A.; Moreno, A. J.; Cangialosi, D.; Alegría, A.; Colmenero, J.; Pomposo, J. A. Single-chain nanoparticles: Opportunities provided by internal and external confinement. Mater. Horizons 2020, 7 (9), 2292-2313.
Nghiem, T. L.; Coban, D.; Tjaberings, S.; Groschel, A. H. Recent advances in the synthesis and application of polymer compartments for catalysis. Polymers (Basel). 2020, 12 (10).
Hart-Cooper, W. M.; Clary, K. N.; Toste, F. D.; Bergman, R. G.; Raymond, K. N. Selective monoterpene-like cyclization reactions achieved by water exclusion from reactive intermediates in a supramolecular catalyst. J. Am. Chem. Soc. 2012, 134 (43), 17873-17876.
Vandichel, M.; Vermoortele, F.; Cottenie, S.; De Vos, D. E.; Waroquier, M.; Van Speybroeck, V. Insight in the activity and diastereoselectivity of various Lewis acid catalysts for the citronellal cyclization. J. Catal. 2013, 305, 118-129.
Bastian, S. A.; Hammer, S. C.; Kreß, N.; Nestl, B. M.; Hauer, B. Selectivity in the Cyclization of Citronellal Introduced by Squalene Hopene Cyclase Variants. ChemCatChem 2017, 9 (23), 4364-4368.
Azkaar, M.; Maki-Arvela, P.; Vajglová, Z.; Fedorov, V.; Kumar, N.; Hupa, L.; Hemming, J.; Peurla, M.; Aho, A.; Murzin, D. Y. Synthesis of menthol from citronellal over supported Ru- and Pt-catalysts in continuous flow. React. Chem. Eng. 2019, 4 (12), 2156-2169.
Smith, D. M.; Woerpel, K. A. Electrostatic interactions in cations and their importance in biology and chemistry. Org. Biomol. Chem. 2006, 4 (7), 1195-1201.
Nardini, V.; Dias, L. G.; Palaretti, V.; da Silva, G. V. J. Citronellal assumes a folded conformation in solution due to dispersion interactions: A joint NMR-DFT analysis. J. Mol. Struct. 2018, 1157, 401-407.
Case, D. A., et al. AmberTools2017, University of California, San Francisco.(2017).
Frisch, Michael J., et al. "Gaussian 03, Revision C. 02. Wallingford, CT: Gaussian." Inc. (2004). https://web.archive.org/web/20040714005206/http:/gaussian.com/.
Humphrey, W.; Dalke, A.; Schulten, K. VMD: Visual molecular dynamics. J. Mol. Graph. 1996, 14 (1), 33-38.
Smith, A. A. A.; Hall, A.; Wu, V.; Xu, T. Practical Prediction of Heteropolymer Composition and Drift. ACS Macro Lett. 2019, 8 (1), 36-40.
Martínez, L.; Andrade, R.; Birgin, E. G.; Martínez, J. M. Packmol: A package for building initial configurations for molecular dynamics simulations. J. Comput. Chem. 2009, 30 (13), 2157-2164.
Kumar, S.; Rosenberg, J. M.; Bouzida, D.; Swendsen, R. H.; Kollman, P. A. The weighted histogram analysis method for free-energy calculations on biomolecules. I. The method. J. Comput. Chem. 1992, 13 (8), 1011-1021.
Grossfield, Alan. "WHAM: the weighted histogram analysis method, version 2.0. 9." Available at membrane. urmc. rochester. edu/content/wham. Accessed Nov. 15 (2013): 2013.
Panganiban, et al., Random Heteropolymers Preserve Protein Function in Foreign Environments. Science (1979) 2018, 359 (6381), 1239-1243.
Shu, Jessica Y., et al. "New design of helix bundle peptide—polymer conjugates." Biomacromolecules 9.8 (2008): 2111-2117.
Hammer, Stephan C., et al. "Squalene hopene cyclases are protonases for stereoselective Brønsted acid catalysis." Nature chemical biology 11.2 (2015): 121-126.
Walker, F. Ann, David Reis, and Virginia L. Balke. "Models of the cytochromes b. 5. EPR studies of low-spin iron (III) tetraphenylporphyrins." Journal of the American Chemical Society 106.23 (1984): 6888-6898.
Berthomieu, et al., Biochemistry 1992, 31, 14460-1141.
Gibney, Brian R., and P. Leslie Dutton. "Histidine placement in de novo-designed heme proteins." Protein science 8.9 (1999): 1888-1898.
Moffet, David A., et al. "Peroxidase activity in heme proteins derived from a designed combinatorial library." Journal of the American Chemical Society 122.31 (2000): 7612-7613.
Monera, Oscar D., et al. "Relationship of sidechain hydrophobicity and a-helical propensity on the stability of the single- stranded amphipathic a-helix." Journal of peptide science: an official publication of the European Peptide Society 1.5 (1995): 319-329.

* cited by examiner

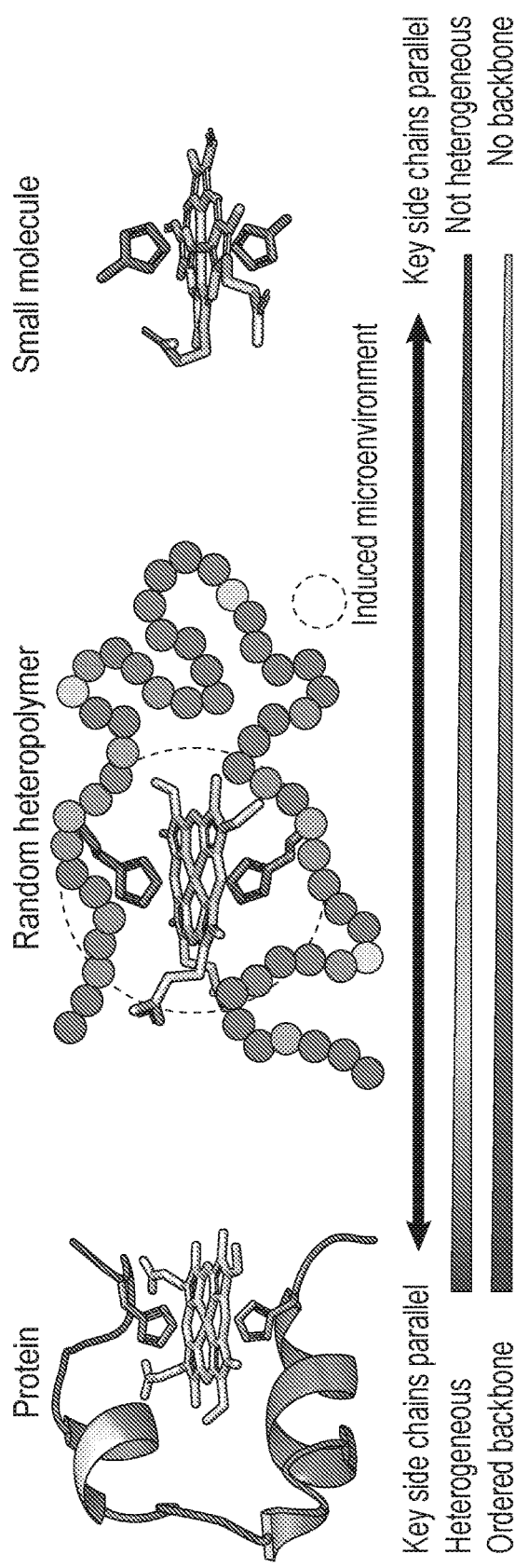
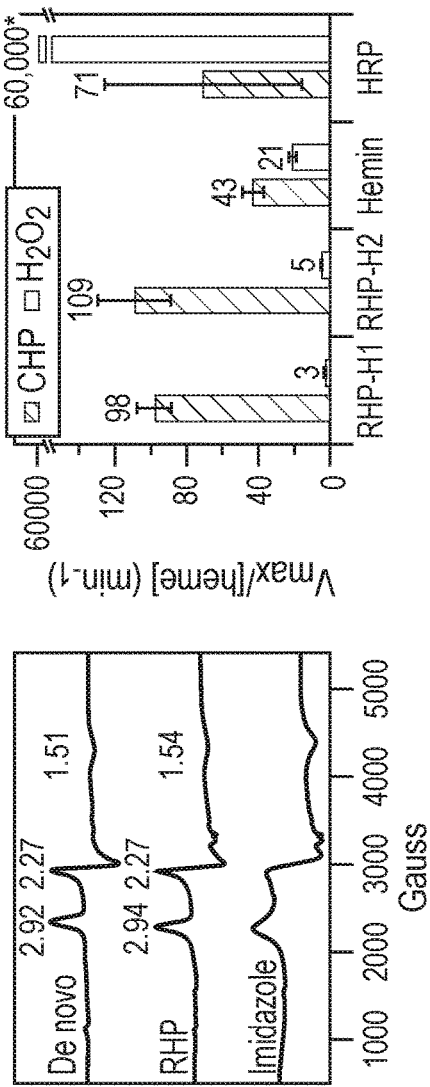
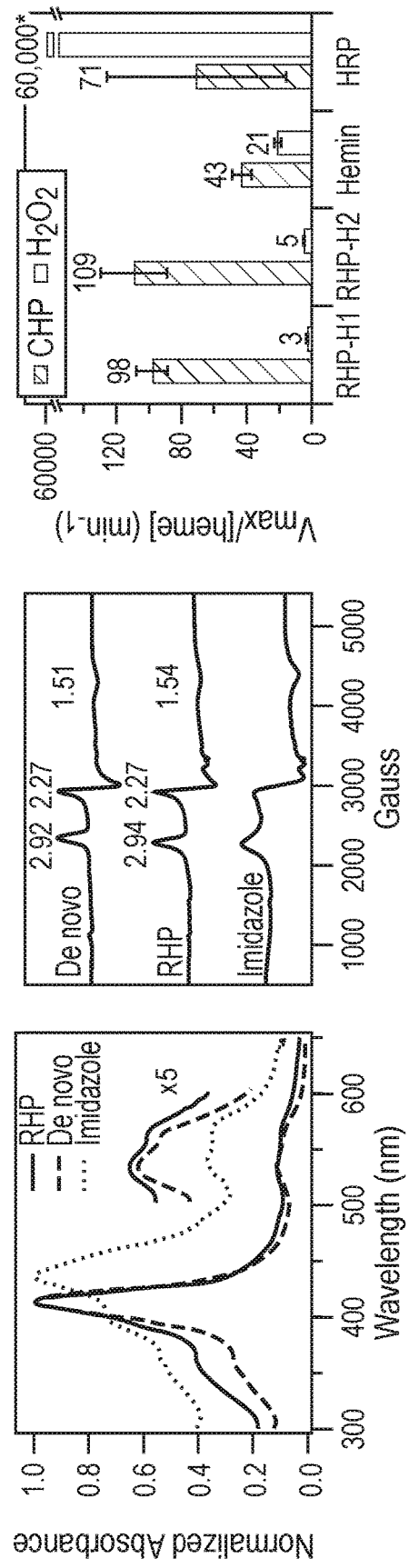
FIG. 3A
FIG. 3B
FIG. 3C
FIG. 3D

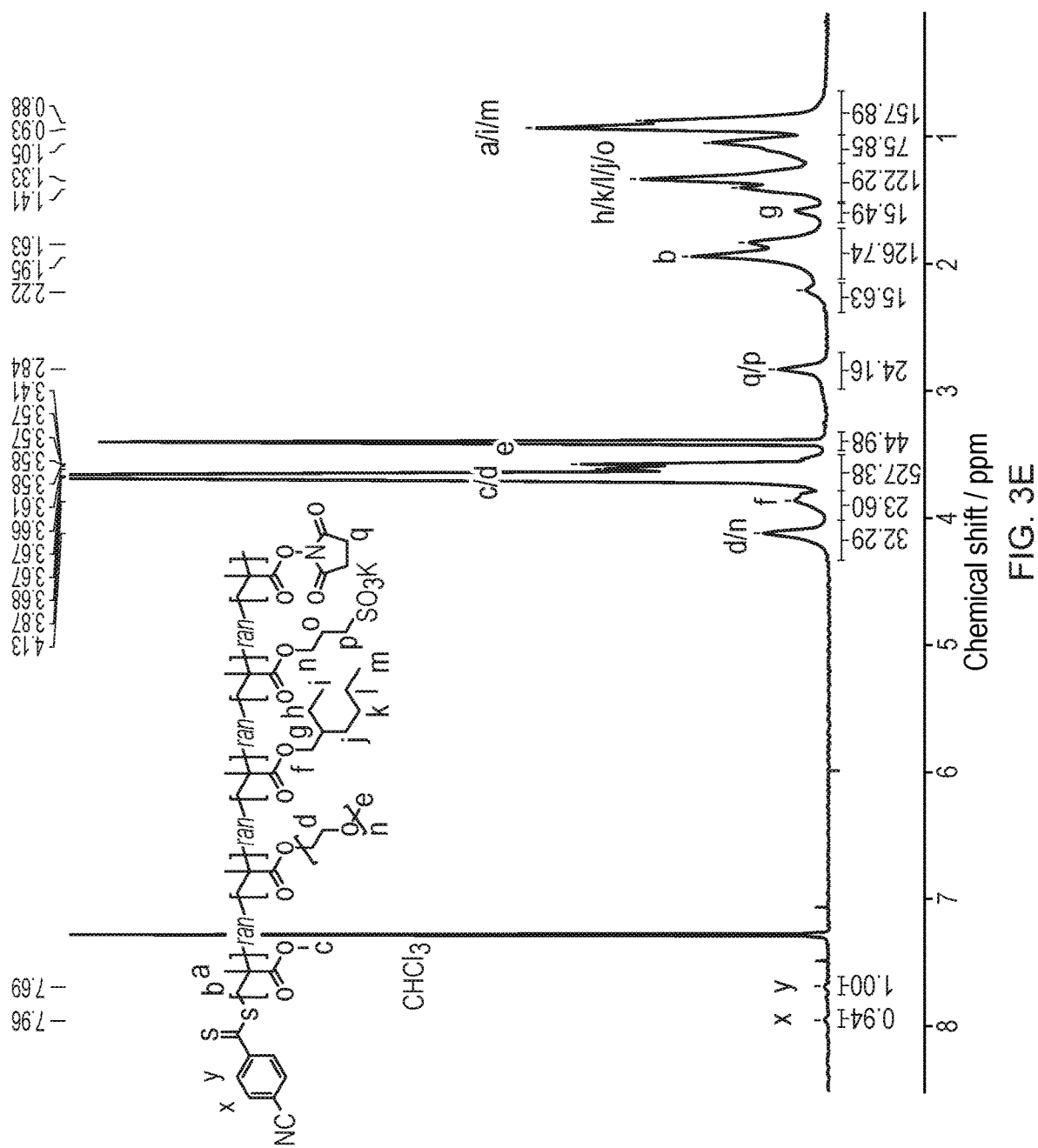

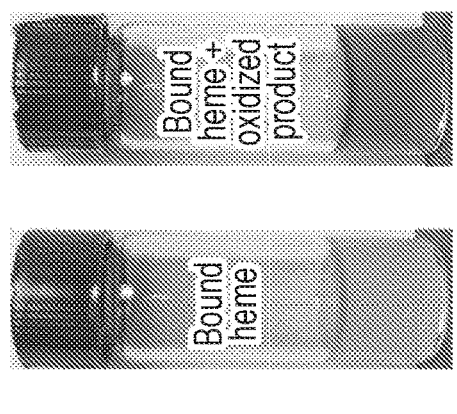
FIG. 4C
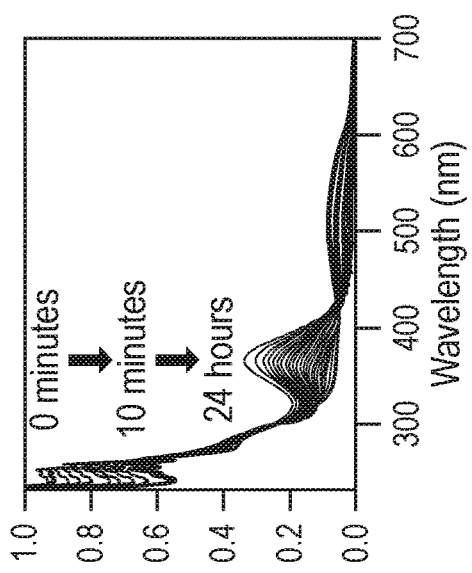
FIG. 4E
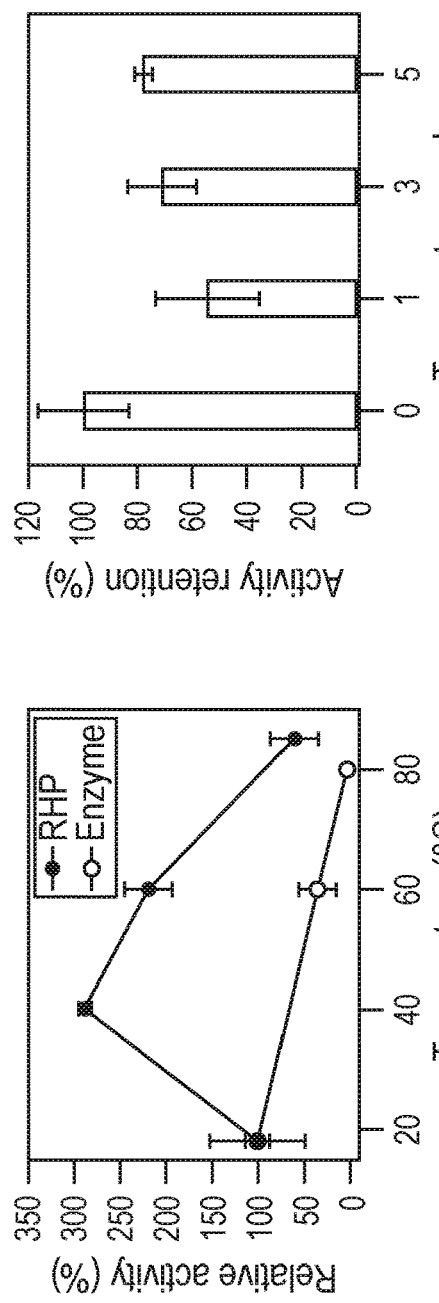
FIG. 4B
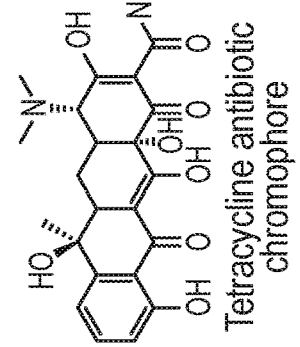
Tetracycline antibiotic chromophore
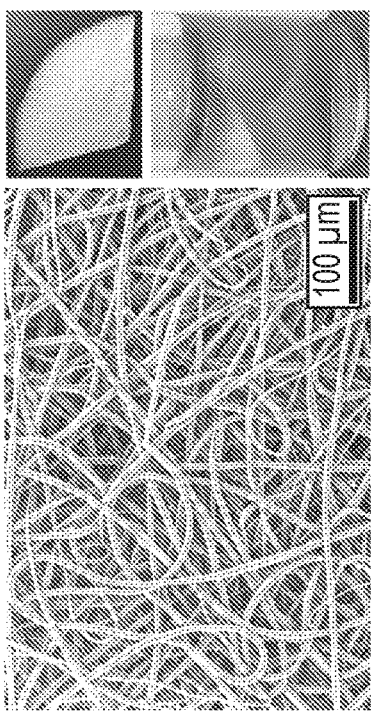
FIG. 4D
FIG. 4A

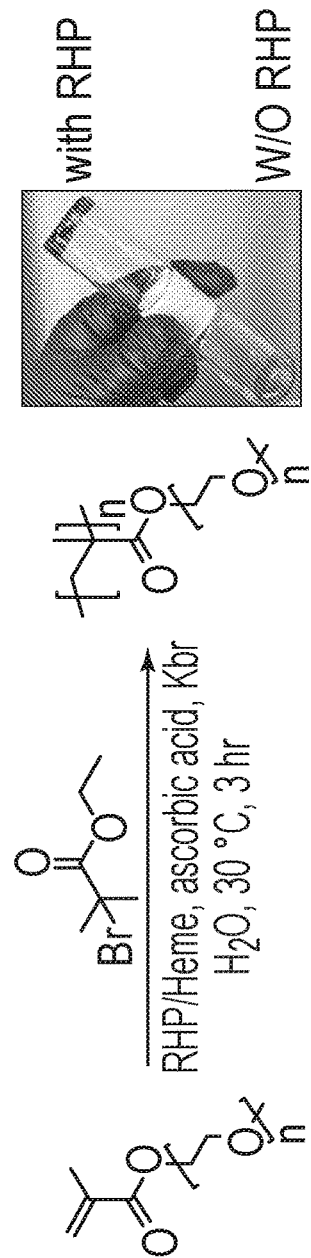
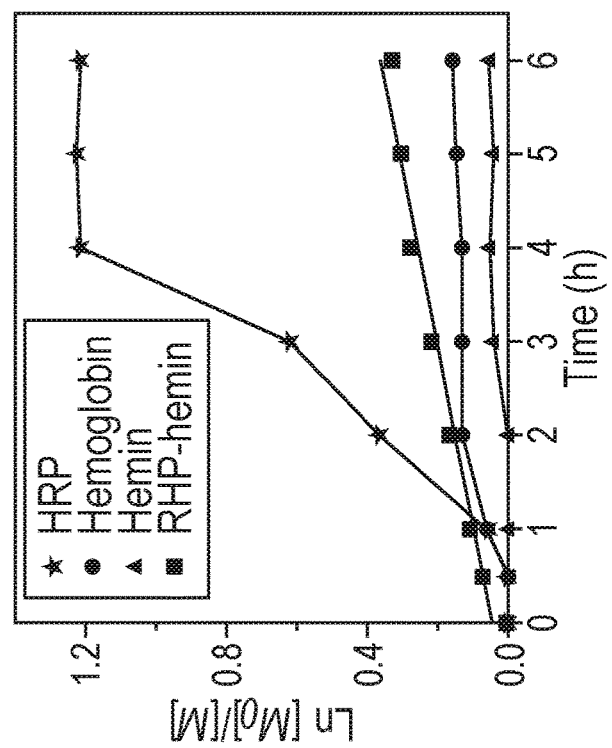
FIG. 5A
FIG. 5B

EVOLVING RANDOM HETEROPOLYMERS TOWARDS CATALYTICALLY ACTIVE MATERIALS

CROSS REFERENCE TO RELATED APPLICATIONS

This application is a U.S. national counterpart application of International Patent Application No. PCT/US2023/076277, entitled "EVOLVING RANDOM HETEROPOLYMERS TOWARDS CATALYTICALLY ACTIVE MATERIALS," filed Oct. 6, 2023, which claims priority to and the benefit of U.S. Provisional Patent Application No. 63/430,902, entitled "Evolving Random Heteropolymers Towards Catalytically Active Materials," which was filed on Dec. 7, 2022, the contents of which are incorporated by reference herein in their entireties.

FEDERALLY SPONSORED RESEARCH

This invention was made with government support under HDTRA11910011 awarded by the Defense Threat Reduction Agency (DTRA). The government has certain rights in the invention.

FIELD

The present disclosure relates to monomer-based heteropolymers as synthetic enzymes evolved to mimic activities of different classes of natural enzymes.

BACKGROUND

Catalytically active materials may be designed to mimic individual or subsets of enzymes. Enzymes are highly evolved to perform a limited set of functions within their native environment. Natural organisms have evolved a heterogeneous array of proteins for similar functions as well as proteins with similar motifs and sequence space, yet differing functions. In a similar fashion, using repeated monomers in a sequence for combination into larger heteropolymers, it is possible to mimic different classes of enzyme functionality with a synthetic system.

One of the key drawbacks to using natural enzymes as large-scale catalysts is the decline in activity that occurs when using an enzyme outside its native environment. Naturally occurring enzymes are incompatible and commonly denatured under material processing conditions. Higher temperatures and solvent presence in these reactions denature enzymes or greatly reduce their activities. Substrate concentrations are also lower in enzyme reactions than those found in material processing conditions to limit interfacial denaturation or the formation of hydrophobic substrate aggregates that denature enzymes. See Panganiban et. al. *Science* 2018, 359, 1239 incorporated herein by reference herein with regard to such background teaching.

Synthetically-produced, biomimetics of these enzymes may, however, overcome many of the drawbacks of native enzymes. Using synthetic random heteropolymers (RHPs) in statistically derived random sequences, structures akin to globular proteins may be formed without the formation of specific structurally tailored active sites. See Smith et. al. *ACS Macro Lett.* 2019, 8, 36 incorporated by reference herein with regard to such background teaching. These RHPs are catalytically active and assemble without cofactors or the incorporation of additional binding sites. The simplicity and easy production of the disclosed RHPs, makes them an attractive alternative to more complex chemistries currently in the art. See Hilburg et. al. *Macromolecules* 2020, 53, 9187 incorporated by reference herein with regard to such background teaching.

Biomimetic catalysts have many potential uses where natural enzyme or chemical catalysts are not compatible. Naturally occurring enzymes possess groups or cofactors that may be reused by a biomimetic, such as heme, for various new chemistries or applications. One such area is the need for more efficient water purification methods. Active plastic materials that specifically catalyze oxidation in water may be applied to the degradation compounds such as tetracycline. Tetracycline is a commonly used livestock antibiotic and in the United States, 3200 tons of tetracycline are used per year and introduced into surface water at concentrations up to 1 ppm. This causes detrimental effects for aquatic life and also poses a risk to human health through the development of antibiotic resistance.

Further applications of RHP systems can decrease the environmental impact of commonly performed chemistries such as radical olefin polymerizations. The environmentally benign reaction conditions that can be used with an RHP catalyst may allow for new applications to decrease large-scale environmentally unfriendly chemistries. Thus, there is a great need for the development of synthetic biomimetic catalysts that may be evolved to achieve different functions.

BRIEF SUMMARY OF THE DISCLOSURE

One embodiment described herein is a composition of biomimetic catalyst molecules comprising a mixture of heteropolymer sequences wherein a portion of the heteropolymers comprise a catalytically active region similar to that of a naturally occurring enzyme active site, wherein the catalytically active region catalyzes a reaction of a substrate in a manner functionally similar to that of a naturally occurring enzyme; and wherein the heteropolymer sequence comprises 3-dimensional configuration that mimics physicochemical properties of naturally occurring enzymes.

In one aspect, the heteropolymer sequences are random or correlated. In another aspect, the physicochemical properties comprise heterogeneous surfaces.

In one aspect, the physicochemical properties comprises secondary structure, tertiary structure, surface structure, surface hydrophobicity, active site structure, and molecular weight, of a naturally occurring enzyme.

In another aspect, the heteropolymer sequence comprises monomers, the monomers comprising methyl methacrylate (MMA), 2-ethylhexyl methacrylate (2-EHMA), oligo (ethylene glycol) methyl ether methacrylate (OEGMA), or 3-sulfopropyl methacrylate potassium salt (SPMA). In yet another aspect, the heteropolymer sequence further comprises styrene (STY) as one of the monomers. In yet another aspect, the heteropolymer sequence further comprising methacrylic acid N-hydroxysuccinimide ester (NHSMA) as one of the monomers. In one aspect, the N-hydroxysuccinimide ester undergoes aminolysis with a histamine post-polymerization. Any suitable monomer that confers the appropriate physicochemical properties needed to mimic an enzyme may be used herein.

In yet another aspect, the catalytically active region binds heme.

In yet another aspect, the composition comprises a) about 50% to about 80% hydrophobic monomers; b) about 15% to about 40% charged or polar monomers; and c) about 0.01% to about 20% catalytically active region monomers. In yet another aspect, the composition comprises composition comprises a) about 40% to about 60% MMA; b) about 0.01% to about 30% OEGMA; c) about 5% to 4 about 0% EHMA; d) about 0.01% to about 25% SPM; and e) about 0.01% to about 15% STY. In another aspect, the composition comprises a) about 25% to about 60% MMA; b) about 10% to about 35% OEGMA; c) about 10% to about 45% EHMA; d) about 0.01% to about 10% SPMA; and e) about 0.01% to about 15% NHSMA.

In another embodiment described herein is a biomimetic catalyst molecule comprising: a heteropolymer sequence comprising a catalytically active region similar to that of a naturally occurring enzyme active site, wherein the catalytically active region catalyzes a reaction of a substrate in a manner functionally similar to that of a naturally occurring enzyme; and wherein the sequence comprises a 3-dimensional configuration of a naturally occurring protein structure.

In another embodiment described herein is a method of catalyzing a reaction comprising: a) providing the biomimetic catalyst described herein b) incorporating a substrate; and c) catalyzing a reaction. In one aspect, the catalysis of a reaction occurs at a temperature of about 40° C. to about 80° C. In another aspect, the catalysis of a reaction occurs after high temperature exposure of at least about 80° C. In another aspect, the catalysis of a reaction occurs in the presence of substrate aggregate. In another aspect, the catalysis of a reaction occurs at the interface of aqueous and organic solutions. In another aspect, the substrate comprises a terpene molecule. In another aspect, the reaction comprises terpene cyclization. In another aspect, the substrate comprises organic peroxides, tetracycline, or olefin. In yet another aspect, the reaction comprises peroxide reduction. In another aspect, the reaction comprises tetracycline oxidation. In another aspect, the reaction comprises radical olefin polymerization.

Another embodiment described herein is a method of making heteropolymeric molecules comprising: collecting sequence simulation inputs; designing a set of candidate heteropolymer sequences, based on the sequence simulation inputs; determining whether the candidate heteropolymers comprise a 3-dimensional structure capable of binding a substrate or cofactor; and performing controlled synthesis of the candidate heteropolymers; wherein the sequence simulation inputs comprise monomer reactivity data; and wherein the controlled synthesis comprises controlling monomer feeding ratio, degree of polymerization, solvents used, temperature and chain transfer agents.

BRIEF DESCRIPTION OF THE FIGURES

FIG. 3A describes the chemical heterogeneity and structure in heme sites with comparable ligation. FIG. 3B describes a graph of the UV/Visible spectra of RHP-H1, a de novo maquette peptide approximating native cytochrome proteins, and imidazole. The de novo maquette trace was reproduced from literature. Q-bands of RHP-H1 and the de novo maquette are enlarged 5×. FIG. 3C describes an electron paramagnetic resonance sample of RHP-2 that was flash frozen in liquid nitrogen and measured on an X-band continuous wave spectrometer. The de novo maquette trace was reproduced from literature. FIG. 3D describes a graph showing the results of a peroxidase assay with 2,2'-azinodi(3-ethyl-benzothiazoline-6-sulfonic acid) as the chromogenic substrate, cumene hydroperoxide (CHP) used as a hydrophobic oxidant, and $H_2O_2$ as a hydrophilic oxidant. Horseradish peroxidase (HRP). FIG. 3E is a $^1H$ NMR spectrum of RHP-N1 (500 MHZ, $CDCl_3$).

FIG. 4A describes a graph illustrating peroxidase activity as a function of temperature. RHP-H3 (RHP) and horseradish peroxidase (Enzyme) were assayed using 2,2'-azino-di(3-ethyl-benzothiazoline-6-sulfonic acid) as the chromogenic substrate and cumene hydroperoxide as a hydrophobic oxidant. FIG. 4B describes a graph depicting peroxidase activity of RHP-H3 assayed after temperature cycles using 2,2'-azino-di(3-ethyl-benzothiazoline-6-sulfonic acid) as the chromogenic substrate and cumene hydroperoxide as a hydrophobic oxidant. A single temperature cycle involved heating to above 80° C. for 10 minutes, then cooling to 20° C. for 10 minutes. FIG. 4C describes a picture of an RHP-H1 reaction with 50 mM cumene hydroperoxide solution in aqueous buffer that produced visible aggregates. The red color indicates RHP-bound heme while the blue color indicates that the chromogenic substrate was oxidized when added. FIG. 4D describes a scanning electron micrograph of micrometer scale electrospun polycaprolactone fibers with encapsulated RHP-H3. The left side shows a centimeter scale electrospun fiber mat which was red, indicating RHP-bound heme. The upper right shows the unsubmerged electrospun fiber mat which was assayed for peroxidase activity by submersion in aqueous solution of chromogenic substrate and cumene hydroperoxide (lower right) and underwent a color change to blue. FIG. 4E describes the structure of tetracycline with the chromogenic portion highlighted and a graph showing the chromophore was degraded in water by RHP-H2 in minutes using cumene hydroperoxide was used as hydrophobic oxidant.

FIG. 5A describes radical polymerization of OEGMA using heme-bound RHP-H2 as a catalyst. [M]/[I]/[Asc. A]/[RHP-heme]=200/1/1/1. The right side depicts a reaction with and without RHP present. FIG. 5B describes comparison of polymerization mediated by heme-bound RHP-H2 and enzymes. Kinetic investigations indicate that the RHP-heme leads to a controlled, living polymerization.

DETAILED DESCRIPTION OF THE DISCLOSURE

Figure 1A:
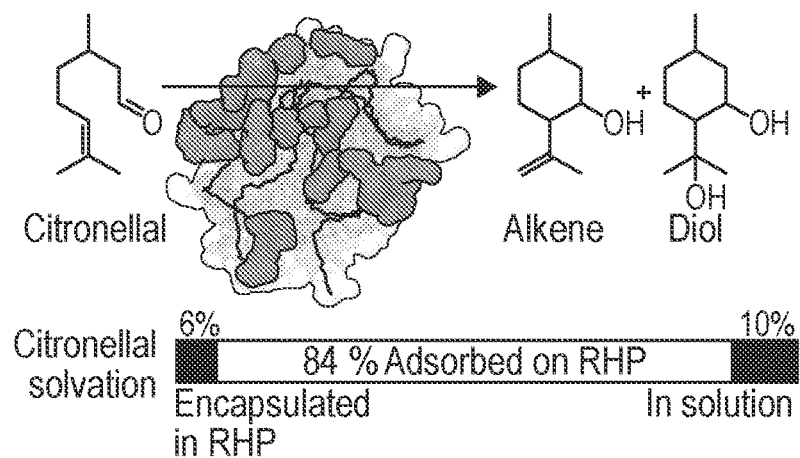
FIG. 1A describes catalysis of a terpene cyclization reaction with citronellal on chemically heterogeneous RHP surfaces produces alkene and diol products.

Through a dynamic array of statistically derived assemblies, synthetic RHPs are capable of performing selective catalysis. By tailoring sequence compositions, RHPs may be designed to present hydrophobic and electrostatic environments to stabilize a wide variety of potential reaction intermediates through an inexpensive and an easily modulated system. The present disclosure highlights RHPs capable of two reaction types: one involving weak substrate incorporation via van der Waals forces labeled RHP-S1, RHP-S2, and RHP-S3 and the other reaction involving cofactor-induced conformation change and formation of a specific active site through metal ligation labeled RHP-H1, RHP-H2, and RHP-H3. Metal ligation provides strong, directional interactions influencing the RHP chain conformation.

Thus described herein is a composition of biomimetic catalyst molecules, a biomimetic catalyst and methods of catalyzing a reaction using the compositions and catalysts described herein.

Definitions

The following definitions are meant to clarify, but not limit, the terms defined. If a particular term used herein is not specifically defined, such term should not be considered indefinite. Rather, terms are used within their accepted meanings.

As used herein, the term "3-dimensional spatial relationship" refers to the three-dimensional structure of a molecule. For example, enzymes typically adopt structures that are globular in shape with an intracellular environment separated from the aqueous exterior environment.

As used herein, the term "active site" refers to the enzyme structure in three dimensions that has projected side chains. The ordering and composition of active sites may vary widely between enzymes. The active site region of a protein may be associated with and necessary for a specific biological activity of the protein. In at least one embodiment, the active site may be a site that binds a substrate or other binding partner and contributes its amino acid residues to directly participate in the making and breaking of chemical bonds.

As used herein, the term "random heteropolymers" or "RHPs" refers to statistically sequence-defined synthetic polymers. Sequences within the composition are determined by the relative monomer concentrations present during synthesis and monomer reactivity ratios. These heteropolymeric molecules are designed with hydrophobic, hydrophilic, and charged groups inspired by naturally occurring proteins. For a given RHP, the RHP chain may adopt different conformations that share similarities in surface compositions and component dynamics.

As used herein, the term "biomimetic catalyst" refers to a synthetically produced molecule that functions similar to that of a naturally occurring enzyme, using a catalytically active region similar to that of a naturally occurring enzyme active site, to promote catalysis. Catalysts are capable of binding a substrate in a specific manner and at a pre-selected location, the catalytically active region, to increase the rate of a given reaction. In some embodiments, the biomimetic catalysts may actually improve upon the characteristics of the native enzyme when comparisons of specificity, turnover rates, temperature sensitivity and the like are carried out.

As used herein, the term "catalytically active region" refers to the microenvironment within the RHP that functions similar to that of a naturally occurring enzyme through promoting catalysis. This region may also incorporate cofactors as part of their catalytic functions. Substrates in contact with this region may undergo their catalyzed reaction into product.

Biomimetic Catalysts

One embodiment of the present disclosure is a composition of a mixture of biomimetic catalyst molecules made up of heteropolymer sequences wherein a portion of the heteropolymers comprising a catalytically active region similar to that of a naturally occurring enzyme active site, wherein the catalytically active region catalyzes a reaction of a substrate in a manner functionally similar to that of a naturally occurring enzyme, and wherein the heteropolymer sequence is capable of assuming a 3-dimensional configuration that mimics physicochemical properties of naturally occurring enzymes.

In one aspect of the disclosure, the heteropolymer sequences, are a random, unrelated assortment, yet perform the same function and catalysis. Synthetic heteropolymers with similar chemical features and spatial distributions of side chains to match the surface pattern of natural proteins may behave like disordered proteins. By tailoring sequence compositions, RHPs may be designed to present hydrophobic and electrostatic environments to stabilize a wide variety of potential reaction intermediates through an inexpensive and easily modulated system. Thus, in another aspect of the disclosure, the sequences are correlated or related based upon average physicochemical properties.

Hence, RHPs may mimic the physical and chemical properties of naturally occurring enzymes. Such properties include, but are not limited to, both secondary and tertiary structure, surface structure, surface hydrophobicity, active site structure, and molecular weight. In one aspect of the disclosure, the physicochemical properties comprise heterogeneous surfaces, of naturally occurring enzymes.

In some aspects of the disclosure, the composition comprises heteropolymer sequence comprises monomers, wherein the monomers are comprised of methyl methacrylate (MMA), 2-ethylhexyl methacrylate (2-EHMA), oligo (ethylene glycol) methyl ether methacrylate (OEGMA), or 3-sulfopropyl methacrylate potassium salt (SPMA). These statistically sequence-defined synthetic polymers may collapse into compact globules in water. Rationally designed, hydrophobic (MMA and EHMA), hydrophilic (OEGMA), and charged (SPMA) groups are inspired by natural proteins and the properties of amino acids. The anionic RHP components may behave similarly to charged components in biomacromolecules which can electrostatically stabilize carbocation intermediates for selective reactivity. Additionally, RHPs may promote geometric stabilization by favoring configurations in which substrate molecules are closer to one another or stabilized to increase the probability of reaction.

When looking at native proteins, approximately half of the accessible area may be nonpolar and hydrophobic in nature. These areas may bind at the native protein binding interface. Thus, in other aspects of the disclosure the composition may comprise a percentage of hydrophobic monomer from about 30% to about 95% hydrophobic monomers, such as from about 40% to about 95% hydrophobic monomers, about 50% to about 95% hydrophobic monomers, from about 60% to about 95% hydrophobic monomers, about 70% to about 95% hydrophobic monomers, about 80% to about 95% hydrophobic monomers, about 30% to about 80% hydrophobic monomers, about 30% to about 70% hydrophobic monomers, about 30% to about 60% hydrophobic monomers, about 30% to about 50% hydrophobic monomers, about 30% to about 40% hydrophobic monomers, about 50% to about 80% of hydrophobic monomers, about 40% to about 80% of hydrophobic monomers, about 50% to about 70% of hydrophobic monomers, about 55% to about 75% of hydrophobic monomers, or about 60% to about 65% of hydrophobic monomers.

In some aspects, the composition may comprise a percentage of charged or polar monomers from about 5% to about 70% of charged or polar monomers, such as from about 10% to about 70% of charge or polar monomers, about 20% to about 70% of charge or polar monomers, about 30% to about 70% of charge or polar monomers, about 40% to about 70% of charge or polar monomers, about 50% to about 70% of charge or polar monomers, about 60% to about 70% of charge or polar monomers, about 5% to about 60% of charge or polar monomers, about 5% to about 50% of charge or polar monomers, about 5% to about 40% of charge or polar monomers, about 5% to about 30% of charge or polar monomers, about 5% to about 20% of charge or polar monomers, about 5% to about 10% of charge or polar monomers, about 15% to about 40% of charged or polar monomers, 20% to about 35% of charged or polar monomers, about 25% to about 30% of charged or polar monomers about 10% to about 60% of charged or polar monomers, about 20% to about 50% of charged or polar monomers, or about 30% to about 40% of charged or polar monomers.

In some aspects of the disclosure, the RHP may catalyze the cyclization of terpene citronellal (CA) with high alkene/diol selectivity (FIG. 1). Terpenes form a class of natural products containing over 60,000 compounds, many of which are bioactive. Enzymes and catalysts catalyzing terpene cyclase reactions are important for applications in pharmaceutical, fragrance, cosmetic, and food industries. Inspired by cation-π interactions that stabilize carbocation intermediates in the squalene hopene cyclase active site, in one aspect of this disclosure the composition further comprises styrene (STY) as one of the monomer-based heteropolymers.

In other aspects of the disclosure is a composition comprising about 40% to about 60% of MMA such as from about 45% to about 55% of MMA or about 50% to about 52% of MMA, about 0.01% to about 30% of OEGMA such as from about 0.5% to about 25% of OEGMA, about 1% to about 20% of OEGMA, about 2% to about 15% of OEGMA, and about 3% to about 10% of OEGMA, about 5% to about 40% of EHMA, such as from about 7% to about 30% of EHMA, about 10% to about 20% of EHMA, or about 15% to about 17% of EHMA, about 0.01% to about 25% of SPMA such as from about 0.05% to about 20% of SPMA, about 1% to about 15% of SPMA, and about 2% to about 10% of SPMA, or about 0.01% to about 20% of STY such as from about 0.05% to about 15% of STY, about 1% to about 10% of STY, or about 2% to about 7% of STY.

RHP design may begin with a four-monomer parent RHP with addition of a fifth monomer as a more effective route to gain cofactor binding and catalytic activity compared to starting with a larger variety of monomers. Thus, in some aspects, the composition may comprise a percentage of catalytically active region monomers from about 0.01% to about 30% catalytically active region monomers, such as from about 0.01% to about 20% catalytically active region monomers, about 0.01% to about 10% catalytically active region monomers, about 0.01% to about 5% catalytically active region monomers, about 0.01% to about 1% catalytically active region monomers, about 0.01% to about 10% catalytically active region monomers, about 0.1% to about 30% catalytically active region monomers, about 1% to about 30% catalytically active region monomers, about 5% to about 30% catalytically active region monomers, about 10% to about 30% catalytically active region monomers, about 20% to about 30% catalytically active region monomers, about 0.5% to about 15% of catalytically active region monomers, about 1% to about 10% of catalytically active monomers, about 5% to about 7% of catalytically active monomers, about 5% to about 20% of catalytically active region monomers, or about 10% to about 15% of catalytically active region monomers.

Monomer selection with catalytically active monomers may be expanded, for example, adding methacrylic acid N-hydroxysuccinimide ester (NHSMA). NHSMA may be modified by post-polymerization aminolysis with histamine, imitating the chemical diversity of peroxidase active sites. Thus, in another aspect, the composition further comprises the monomer methacrylic acid N-hydroxysuccinimide ester (NHSMA). In some aspects, histamine side chains may be incorporated into the RHP post-polymerization to avoid degradation of the polymerizing agent during RHP synthesis. In additional aspects, the composition the N-hydroxysuccinimide ester undergoes aminolysis with a histamine post-polymerization. In further aspects, the catalytically active region binds heme (FIG. 3).

Using heme protein peroxidases as a model, in one aspect the composition comprises about 5% to about 80% of MMA such as from about 25% to about 60% of MMA or about 35% to about 46% of MMA, about 5% to about 50% of OEGMA such as from about 10% to about 35% of OEGMA, about 20% to about 25% of OEGMA or about 23% to about 25% of OEGMA, about 5% to about 60% of EHMA such as from about 10% to 45% of EHMA, about 20% to 30% of EHMA, and about 19% to 35% of EHMA, about 0.01% to about 50% of SPMA such as from about 0.01% to about 10% of SPMA, about 1% to about 8% of SPMA, and about 0.01% to about 5% of SPMA, and about 0.01% to about 40% NHSMA such as from about 0.01% to about 15% of NHSMA, about 3% to about 8% of NHSMA, or about 5% to about 7% of NHSMA.

In addition to the compositions described herein, individual biomimetic catalysts are further contemplated herein. Thus, another embodiment described herein is a biomimetic catalyst molecule comprising a heteropolymer sequence, the heteropolymer sequence comprising a catalytically active region similar to that of a naturally occurring enzyme active site, wherein the catalytically active region catalyzes a reaction of a substrate in a manner functionally similar to that of a naturally occurring enzyme; and wherein the sequence comprises a 3-dimensional configuration of a naturally occurring protein structure. In one aspect the heteropolymer sequence may comprise any of the heteropolymer sequences described herein, including comprising any of the monomers described herein. In another aspect, the catalytically active region may comprise any of the catalytically active regions described herein.

Catalysis Using Biomimetics

Naturally occurring heme peroxidase enzymes catalyze the reduction of hydroperoxides to water or alcohol and are important enzymes in biotechnology applications. Peroxidase active site histidine mediates acid-base catalysis to form a reactive iron (IV)oxo heme intermediate present in enzymes such as horseradish peroxidase. Thus, a composition or biomimetic catalyst as described herein capable of carrying out such reactions would be useful.

Another embodiment of this disclosure describes a method of catalyzing a reaction including providing the biomimetic catalyst as described herein, incorporating a substrate, and catalyzing a reaction. The types of reactions to be catalyzed may vary depending on the mimicking function. For example, reactions may include oxidations, reductions, transferase reactions, hydrolase reactions, lyase reactions, ligase reactions, or isomerase reactions. The present disclosure contemplates compositions of, and biomimetic catalysts, capable of catalyzing any type of reaction that a naturally occurring protein or enzyme may catalyze. In one aspect, the reaction is a reduction reaction. In another aspect, the reaction is a peroxide reduction. A further aspect of this disclosure applies this method to peroxidase activity wherein the substrate is an organic peroxide. Thus, in another aspect, the reaction is an organic peroxidase reaction.

Substrates for the reaction may also vary widely depending on the type of function to be mimicked and the present disclosure contemplates any substrate of a naturally occurring protein or enzyme. For example, naturally occurring heme peroxidase enzymes catalyze the reduction of hydroperoxides to water or alcohol and are important enzymes in biotechnology applications. Peroxidase active site histidine mediates acid-base catalysis to form a reactive iron(IV)oxo heme intermediate present in enzymes such as horseradish peroxidase. In one aspect of this disclosure, the substrate comprises cumene hydroperoxide (FIG. 3).

One aspect of this disclosure utilizes the described catalytic method under conditions that commonly denature enzymes. Interfacial denaturation is commonly seen in enzymes, limiting substrate concentration to avoid formation of hydrophobic substrate aggregates that denature enzymes. One aspect of this disclosure performs catalysis in the presence of substrate aggregates. Another aspect of this disclosure performs catalysis in the presence of aggregates comprised of the heteropolymeric molecule. Aggregate formation of the heteropolymeric molecule may be promoted through heating of the heteropolymer. One aspect of this disclosure utilizes the described method, wherein catalysis of a reaction occurs at a temperature of about 40° C. to 80° C. RHP aggregation may also be reversible by allowing the heated RHP solutions to rest at room temperature. A further aspect of this disclosure includes the method described herein, wherein catalysis of a reaction occurs after high temperature exposure of at least 80° C.

A further aspect of this disclosure performs catalysis at the interface between organic and aqueous layers. In some aspects, solutions of aggregated RHP-heme and substrate were found to undergo a color change consistent with peroxide reduction activity (FIG. 4). Thus, RHP-heme is active at aqueous-organic interfaces and its aggregated conformations may be reversible. Resistance to interfacial deactivation allows RHP-heme to overcome a key barrier to materials processing of enzymes, leading to a wide range of catalytic plastic materials with evolvable activity.

In some aspects the reaction is an oxidation reaction. Another aspect of this disclosure catalyzes a reaction, wherein the substrate is tetracycline. A further aspect of this disclosure catalyzes reaction, wherein the reaction is the oxidation of tetracycline (FIG. 4). Tetracycline may be degraded by enzymes and organisms expressing tetracycline degrading enzymes are of concern for evolving further antibiotic resistance, limiting their technological application. RHPs with the heme-containing region of naturally occurring proteins catalyzed substrates rarely degraded by enzymes due to their distinct microenvironments within their catalytically active regions. The resistance to deactivation by interfacial aggregation suggests they are incorporated into active materials for material production.

Another aspect of the present disclosure catalyzes a reaction, wherein the reaction is a radical olefin polymerization. Another aspect of the disclosure catalyzes a reaction, wherein the substrate of the reaction is an olefin. Expansion of the RHP-heme system to chemistries unnatural to naturally occurring enzymes is possible through the use of Fe(II)/Fe(III) metalloredox radical chemistry. Natural enzymes including HRP and myoglobin generally show a poor control on the radical polymerization. Thus, the RHP-heme-catalyzed polymerization may allow for new applications in biology, due to its environmentally benign reaction conditions and heme's biocompatibility.

Some aspects of the disclosure include the biomimetic catalyst molecules which catalyzes a reaction, wherein the reaction catalyzed is a terpene cyclization reaction. Another aspect includes a reaction, wherein the substrate is a terpene molecule. A further aspect includes a reaction, wherein the substrate is citronellal. The cyclization of citronellal into the hydrophobic isopulegol product over the more hydrophilic diol product is industrially relevant for menthol synthesis. RHPs are able to position both anionic side chains and citronellal (CA) substrate in a hydrophobic microenvironment. This stabilizes the carbocation intermediates to accelerate cyclization and minimize the availability of water molecules to avoid diol formation (Schematic 1). Despite the high selectivity observed, citronellal incorporation in RHPs is driven principally by hydrophobicity, contributing to a coarsely defined microenvironment.

Reaction 1. Reaction schematic of citronellal cyclization to the diol product (top) and the isopulegol hydrophobic product (bottom). Stereochemistry is not specified in this schematic.

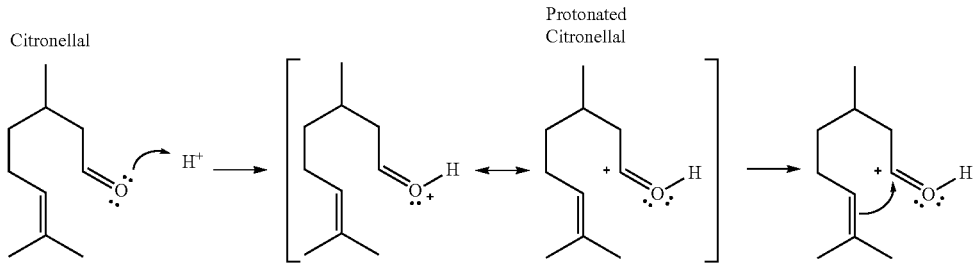

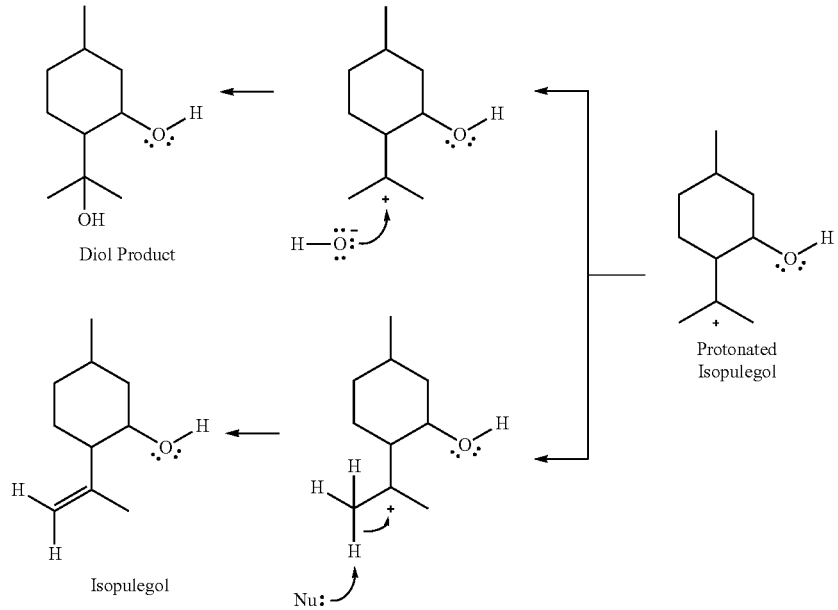

In addition to the reactions described herein, methods of using the biomimetic catalysis are further contemplated herein. Thus, another embodiment described herein is a method of using a biomimetic catalyst to catalyze a reaction, comprising a mixture of heteropolymer sequences, the heteropolymer sequences comprising a catalytically active region similar to that of a naturally occurring enzyme active site, wherein the catalytically active region catalyzes a reaction of a substrate in a manner functionally similar to that of a naturally occurring enzyme; and wherein the sequences comprise a 3-dimensional configuration of a naturally occurring protein structure. In one aspect the reactions may comprise any of the reactions described herein, or any reactions for which a biomimetic catalyst may be mad. In another aspect, the biomimetic catalysis may comprise any of the heteropolymer sequences described herein.

Production of Biomimetic Catalysts

Another embodiment of this disclosure includes a method of producing heteropolymeric molecules that catalyze a reaction of a substrate in a manner functionally similar to that of a naturally occurring enzyme and/or enzyme complex comprising first computationally designing a set of candidate monomer-based heteropolymer sequences, wherein the sequences are evaluated on monomer reactivity, second, determining whether the each member of the set of candidate monomer-based heteropolymers is capable of assuming a 3-dimensional structure using atomistic molecular dynamics simulations, third, determining whether the 3-dimensional structure of each candidate monomer-based heteropolymer contains a microenvironment capable of binding a substrate or cofactor, and lastly, rationally designing the microenvironment further to bind substrate or cofactor and catalyze a reaction.

In some aspects, sequences are created using the program Composition Drift. The program offers a simplified understanding of how a change in monomer composition in batch polymerizations is reflected in the polymer. Parameters used include the number of unique monomers, relative molar ratios, the number-average degree of polymerization at 100% conversion, and the reactivity ratios of all monomers with each other.

Evolution of the microenvironment present within an RHP, may be accomplished through adjusting the microenvironment monomer identity and composition, producing collapsed globules with rationally adjusted chemical heterogeneity and key monomer projection, and proceeding step-wise through sequence space. In some aspects, selection of microenvironment monomers uses previously designed RHPs withe monomers selected for their known roles in metal ligation or catalysis. There is certain flexibility in monomer side chain chemistry, allowing the straightforward incorporation of any of the hundreds of commercially available monomers into the RHP. Similar to how directed evolution of proteins produces ensembles of mutants with high sequence identity, analogous to families of homologous enzymes, RHP ensembles may have statistical sequence similarity yet low sequence identity. Thus, in some aspects, a rationally designed sequence space composed of four or five RHP monomers may be diversified to experimentally hone in on high performing populations within the heterogeneous ensemble. Specific monomers may be incorporated through post-synthetic modification of RHPs while the microenvironment may be adjusted through experimental monomer composition change, providing orthogonal approaches for incorporation of catalytic functionality and for the local enrichment of substrates and modulation of reaction microenvironments.

EXAMPLES

Example 1: RHP-S1, RHP-S2, and RHP-S3

The RHPs for the catalysis of terpene cyclization were designed, synthesized, and tested with the substrate citronellal for activity and high alkene/diol selectivity. Sequences were generated using Compositional Drift, a program based on the Mayo-Lewis model, which considers the relative monomer concentrations and monomer reactivity ratios (see Hilburg, S. L., Ruan, Z., Xu, T. & Alexander-Katz, A. Behavior of Protein-Inspired Synthetic Random Heteropolymers. *Macromolecules* 53, 9187-9199 (2020) and Frisch, M. J. et al. G16_C01. Gaussian 16, Revision C.01, Gaussian, Inc., Wallin (2016))

General Polymerization Procedure for RHP Synthesis

RHPs were synthesized following the procedure from our previous study (Panganiban, B.; Qiao, B.; Jiang, T.; DelRe, C.; Obadia, M. M.; Nguyen, T. D.; Smith, A. A. A.; Hall, A.; Sit, I.; Crosby, M. G.; Dennis, P. B.; Drockenmuller, E.; Olvera de la Cruz, M.; Xu, T. Random Heteropolymers Preserve Protein Function in Foreign Environments. *Science* (1979) 2018, 359 (6381), 1239-1243). To an oven-dried Schlenk flask, monomers, initiator (AIBN), chain transfer agent, DMF, and Milli Q water (5%) were added. The reaction mixture underwent freeze-pump-thaw three times. The flask was then placed in an oil bath at 70 or 80° C. After given time, the reaction mixture was quenched by placing the flask into liquid nitrogen. The reaction mix was precipitated in pentane three times. After removing the supernatant, the bottom RHP layer was diluted with Milli Q water and transferred to a dialysis bag (MWCO=2k). The resultant polymer mixture was dialyzed against Milli Q water for 3 days and then was lyophilized. The final RHP was obtained as a pink or orange gel.

RHP-S1 Synthesis (MMA:OEGMA500:EHMA:SPMA:STY=50:25:20:5:0): prepared according to the general polymerization procedure using MMA (1.6 mL), OEGMA500 (3.8 mL), EHMA (1.3 mL). SPMA (370 mg), CTA (2-Cyano-2-propyl benzodithioate) (44 mg), AIBN (2.4 mg), DMF (6.4 mL), and water (0.3 mL). The reaction was run at 70° C. for 5 h. The polymer was obtained as a purple gel (Yield: 46%).

RHP-S2 Synthesis (MMA:OEGMA500:EHMA:SPMA:STY=50:5:30:15:0): prepared according to the general polymerization procedure using MMA (1.6 mL), OEGMA500 (0.7 mL), EHMA (2.0 mL), SPMA (1108 mg), CTA (2-Cyano-2-propyl benzodithioate) (44 mg), AIBN (2.4 mg), DMF (5.4 mL), and water (0.5 mL). The reaction was run at 70° C. for 5 h. The polymer was obtained as a purple gel (Yield: 64%).

RHP-S3 Synthesis (MMA:OEGMA500:EHMA:SPMA:STY=48:10:14:10:18): prepared according to the general polymerization procedure using MMA (1.6 mL), OEGMA500 (1.4 mL), EHMA (1.0 mL), SPMA (739 mg), CTA (4-Cyano-4-[(dodecylsulfanylthiocarbonyl) sulfanyl]pentanoic acid) (61 mg), AIBN (2 mg), DMF (5.2 mL), and water (0.2 mL). The reaction was run at 70° C. for 24 h. The polymer was obtained as a purple gel (Yield: 54%).

Molecular Dynamic (MD) Simulations of RHP-S1 and RHP-S2

Figure 2A:
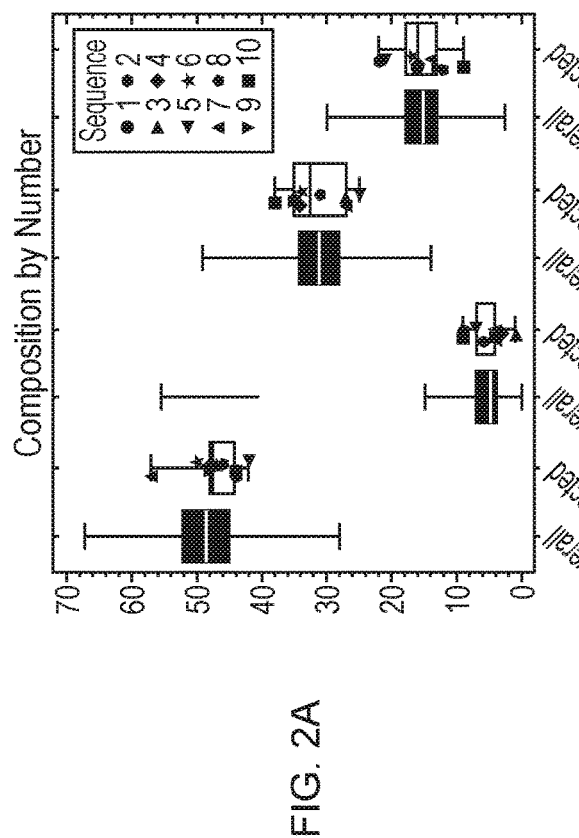
FIG. 2A describes the composition of examined sequences selected from Compositional Drift output (full output denoted as "Overall").
Figure 2B:
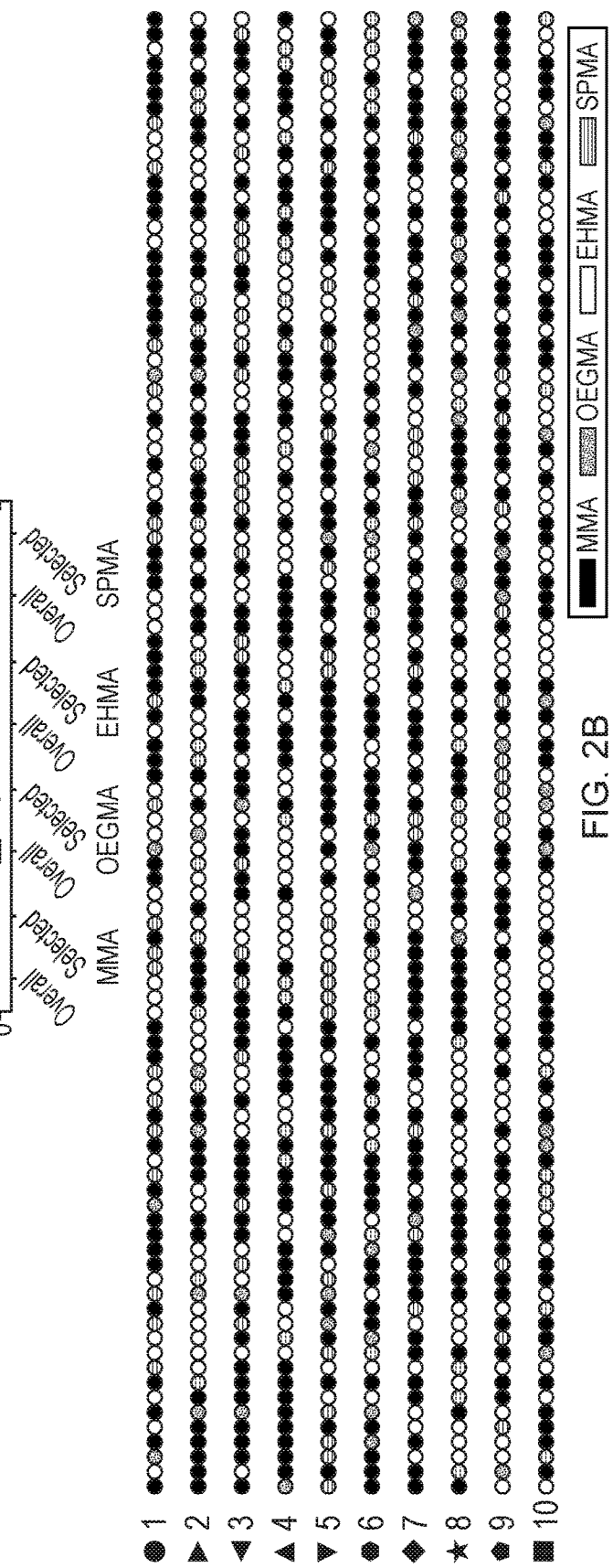
FIG. 2B describes the sequences examined with MMA in black, OEGMA in dark gray, EHMA in white, and SPMA in light gray.
Figure 2C:
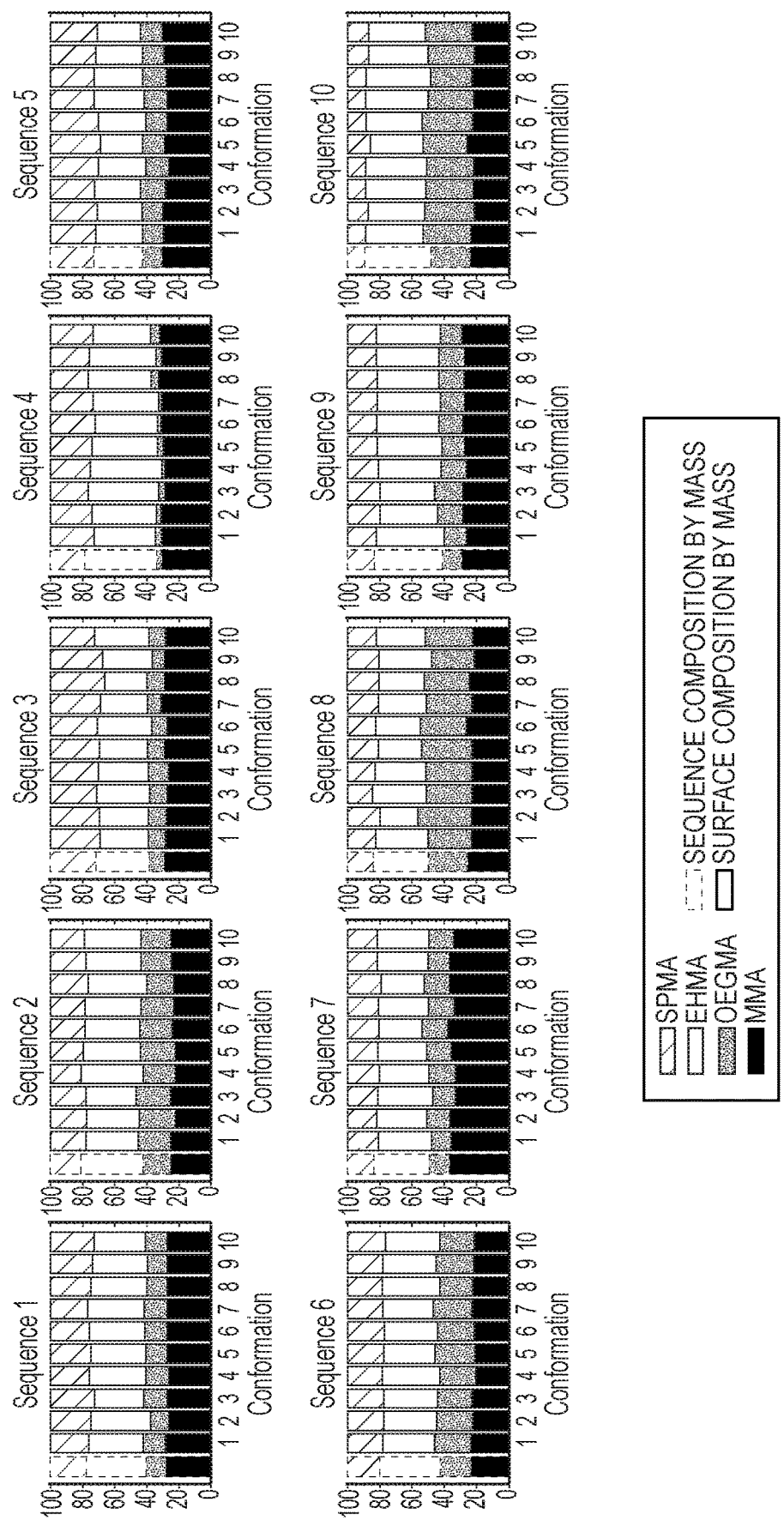
FIG. 2C shows the surface compositions for all conformations compared to sequence composition by mass as calculated by alpha shape analysis. Plots are shown for 10 RHP-S2 sequences.

To probe the conformation and segmental dynamics of collapsed RHP chains, atomistic molecular dynamics (MD) was performed in an ensemble of four-monomer RHPs. For a given sequence, the RHP chain may adopt different conformations that share similarities in surface compositions and component dynamics. Different conformations of a given sequence have unique topological backbone arrangements and are not observed to interconvert from one conformation to the next, showing stability on the simulation timescale of nano to micro-seconds. While hydrophilic and hydrophobic side chains show a propensity to be well- or poorly-solvated, respectively, all monomer types are consistently represented at both the surface and interior of the chain assembly in the various topological conformations (FIG. 2C).

RHP-S1 data used for comparison is from simulations performed for and described in prior work (see Hilburg, S. L., Ruan, Z., Xu, T. & Alexander-Katz, A. Behavior of Protein-Inspired Synthetic Random Heteropolymers. *Macromolecules* 53, 9187-9199 (2020)). Atomistic MD Simulations of RHP-S2 were performed using the same simulation and analysis procedures and parameterizations as the prior work with a few modifications per the following procedure. RHP-S2 sequences used in simulation and parameterized the same as prior work (FIGS. 2A and 2B). After a short minimization, the system was equilibrated at 500 K for 40 ns and then ramped down to 300 K over 40 ns in implicit solvent. This cycle was successively repeated for a total of ten anneals for each simulated sequence. Each implicitly annealed structure was then explicitly solvated in a periodic octahedral geometry with approximately 40,000 molecules of SPC/E water and potassium counter-ions to offset SPMA charges for explicit solvent simulation. The ten conformations for each sequence were then annealed explicitly with constant volume, but, followed a simplified temperature profile compared to the prior work. Each structure was brought to 650 K and held for 20 ns and then cooled down to 300 K over 40 ns. The structures were then held at 300 K and 1.0 bar for 60 ns, of which the final 40 ns were used for analysis. All analysis was performed the same as prior work except that solvation analysis includes all 100 residues in each sequence conformation rather than removing chain ends as was done in prior work (FIG. 2C).

MD Simulations of RHP-S2 with Citronellal (CA):

MD was used to provide insight into the location and distribution of CA as well as RHP conformations and chemical diversity. By including CA in MD simulations, it was also demonstrated that the substrates adsorb to the RHP surface, and infiltrate into interior locations that are shielded from water. In simulations with 20:1 CA:RHP using five separate RHP conformations, CA substrates spent 84% of the characterized time (final 100 ns of 120 ns simulations) adsorbed to the polymer and 6% of the characterized time shielded from water, with six or fewer water molecules within the first two solvation shells (5.5 Å) of the substrate (FIG. 1A). Adsorbed substrates contact EHMA residues, though some contact is observed between CA and each monomer type.

Of the 100 conformations created by annealing ten unique RHP-S2 sequences ten times each, five structures were then used for the CA substrate studies including Sequence 10 (conformation 7), Sequence 2 (conformations 2 and 8), and Sequence 3 (conformations 6 and 10). The simulations began with the final RHP conformation from production simulations of the above conformations. Substrates were parameterized in the same manner as monomers in prior work and added to equilibrated RHP conformations using PACKMOL.[doi: 10.1002/jcc.21224] twenty substrate molecules, approximately 20,000 molecules of water, and potassium counterions as needed to maintain neutral charge were added to each RHP conformation. Configurations were run at 300 K for 120 ns.

The CA substrate study results were from the final 100 ns of simulation at 300 K. Substrate adsorption "on" or encapsulated "in" the RHP is defined by the number of water molecules within the second solvation shell (within 5.5 Å of the atoms in the substrate molecule) over time. Substrates are categorized as adsorbed "on" if there are 60 or fewer water molecules and "in" if there are 6 or fewer water molecules in their solvation shells.

Nuclear Overhauser Effect Spectroscopy (NOESY)

NOESY experiments were carried out to identify specific RHP monomers forming the microenvironment of citronellal. NOESY spectra were measured with a Bruker AV-600 spectrometer at room temperature (298 K) with mixing time (D8=0.4 s). Spectra were assigned according to a previous publication on random heteropolymers.

Figure 1B:
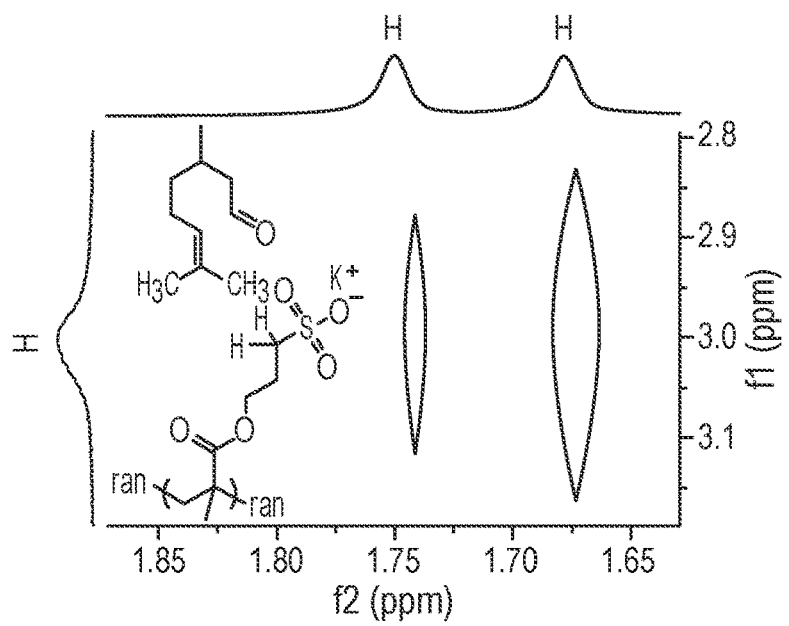
FIG. 1B describes a through-space NOESY spectra of citronellal and RHP-S2 in buffer.

The results show interaction of the citronellal aldehyde proton with OEGMA in RHP-S1 and a weaker interaction with alkyl groups (0.7-1.5 ppm). In RHP-S2, the citronellal aldehyde group interacts more with alkyl groups (0.7-2.0 ppm) and with OEGMA. RHP-S2 SPMA methylene protons interact with citronellal isobutene group protons (FIG. 1B).

General Procedure of Terpene Cyclization Reaction

Terpene cyclization reactions were carried out under vacuum at 60° C. for 24 hours in pH 7 buffer containing 0.7 mM RHP and 0.56 M citronellal and subsequently separated for analysis. To a 2 mL pre-scored ampule, were RHP solution (20 mg/mL, 0.5 mL), 100 mM sodium phosphate (pH 7.0, 50 µL), and citronellal (0.56 M in DMSO-d6, 10 µL) added and vortexed. Then, the ampule was frozen in liquid nitrogen and sealed at 200 mTorr. The tube was placed in oven at 60° C. After 24 h, the reaction mixture was cooled down to room temperature and extracted with chloroform-d (400 µL×2) and filtered thru $MgSO_4$ column. The extract was measured in NMR with o-Xylene (1 µL) as an internal standard. The product NMR was matched with prior work (see Hart-Cooper, W M. et. al. *J. Am. Chem. Soc.* (2012) 134, 17873).

Figure 1C:
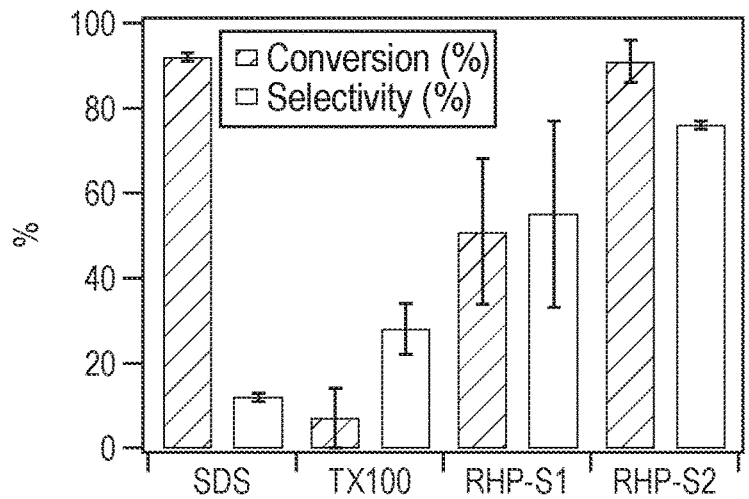
FIG. 1C describes a graph illustrating citronellal conversion (%) and alkene selectivity (%) for the terpene cyclization reaction after 24 hours compared with negatively charged surfactant sodium dodecyl sulfate (SDS) and neutral surfactant Triton X-100 (TX100).

RHP-S1 catalyzed terpene cyclization with 51±17% conversion and 55±22% alkene selectivity (FIG. 1C). RHP-S2 showed 91±5% conversion with 76±5% alkene selectivity (FIG. 1C). RHP-S3 showed 89±2% conversion and 80±1% alkene selectivity (n=3). RHP-S2 catalyzed citronellal cyclization at a rate of $6.3\times10^{-3}$ $min^{-1}$. For purposes of comparison, supramolecular cages catalyze the reaction at a rate of $4.2\times10^{-3}$ $min^{-1}$ and alkene selectivity of 97% and an I261A squalene hopene cyclase enzyme mutant catalyzes the reaction at a rate of $2.8\times10^{-3}$ $min^{-1}$ and alkene selectivity of 99%.

Example 2: RHP-H1, RHP-H2, and RHP-H3

Composition of the RHP-H1 MMA 42/OEGMA 22/EHMA 22/SPMA 5/NHSMA 10 was based on that of the parent RHP-S1 and hydrophobicity was increased in RHP-H2 MMA 38/OEGMA 26/EHMA 23/NHSMA 13 by removal of SPMA. The overall synthesis of the RHP-H1, RHP-H2, and RHP-H3 is depicted in Scheme 2.

Scheme 2: Synthesis of RHP-N1, RHP-N2, and RHP-N3 with post synthetic modification to obtain RHP-H1, RHP-H2, and RHP-H3.

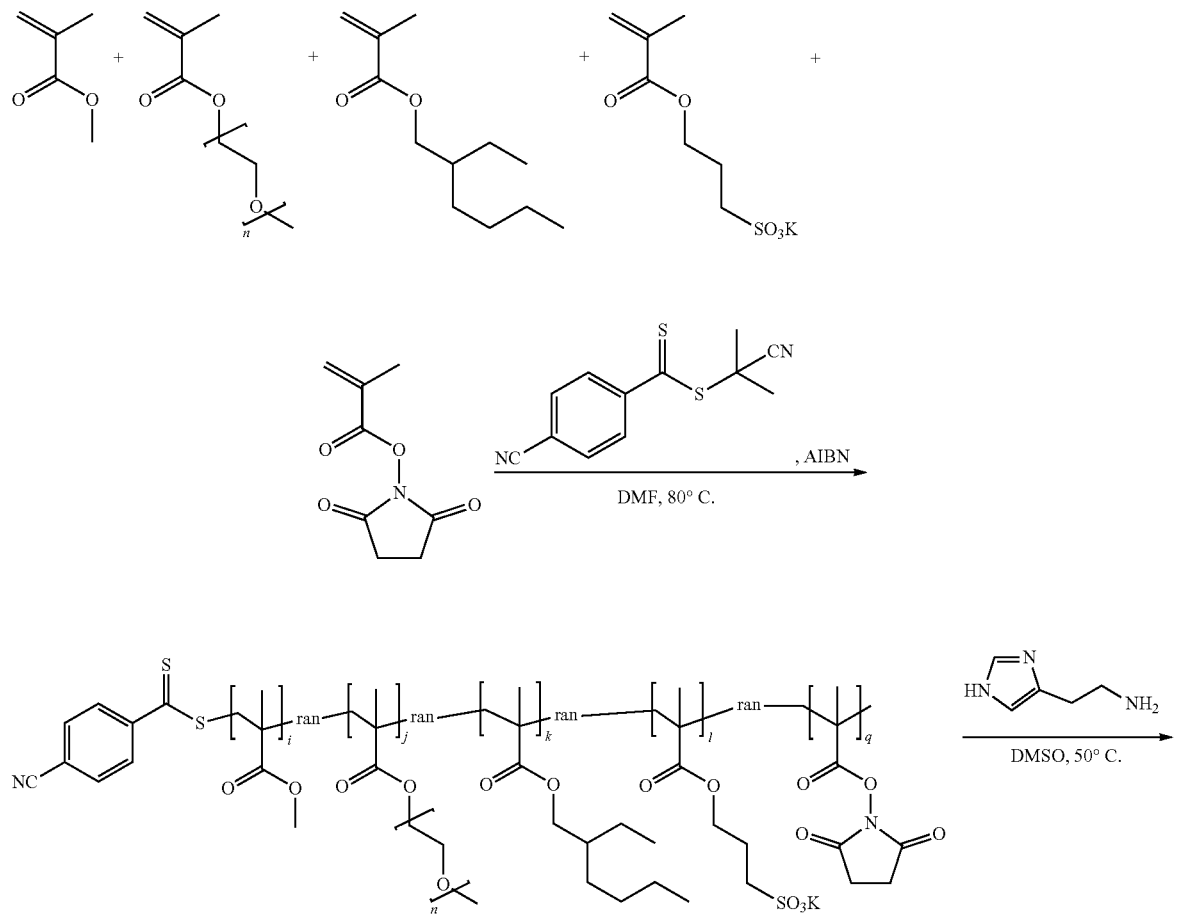

-continued

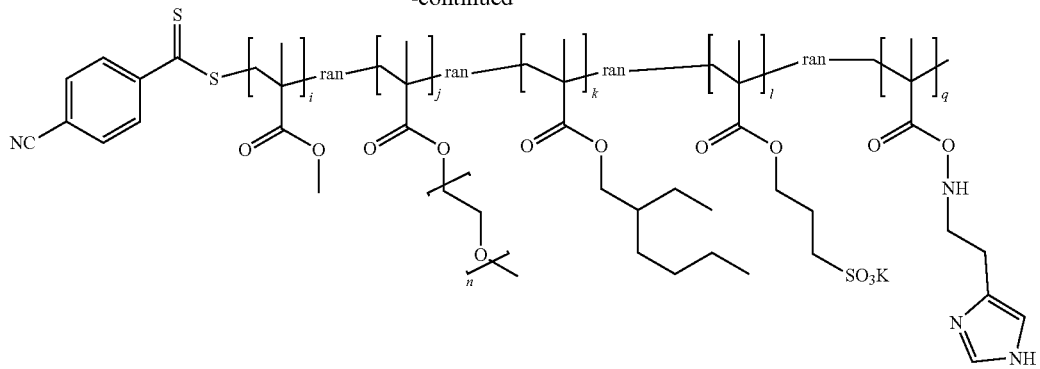

Figure 3F:
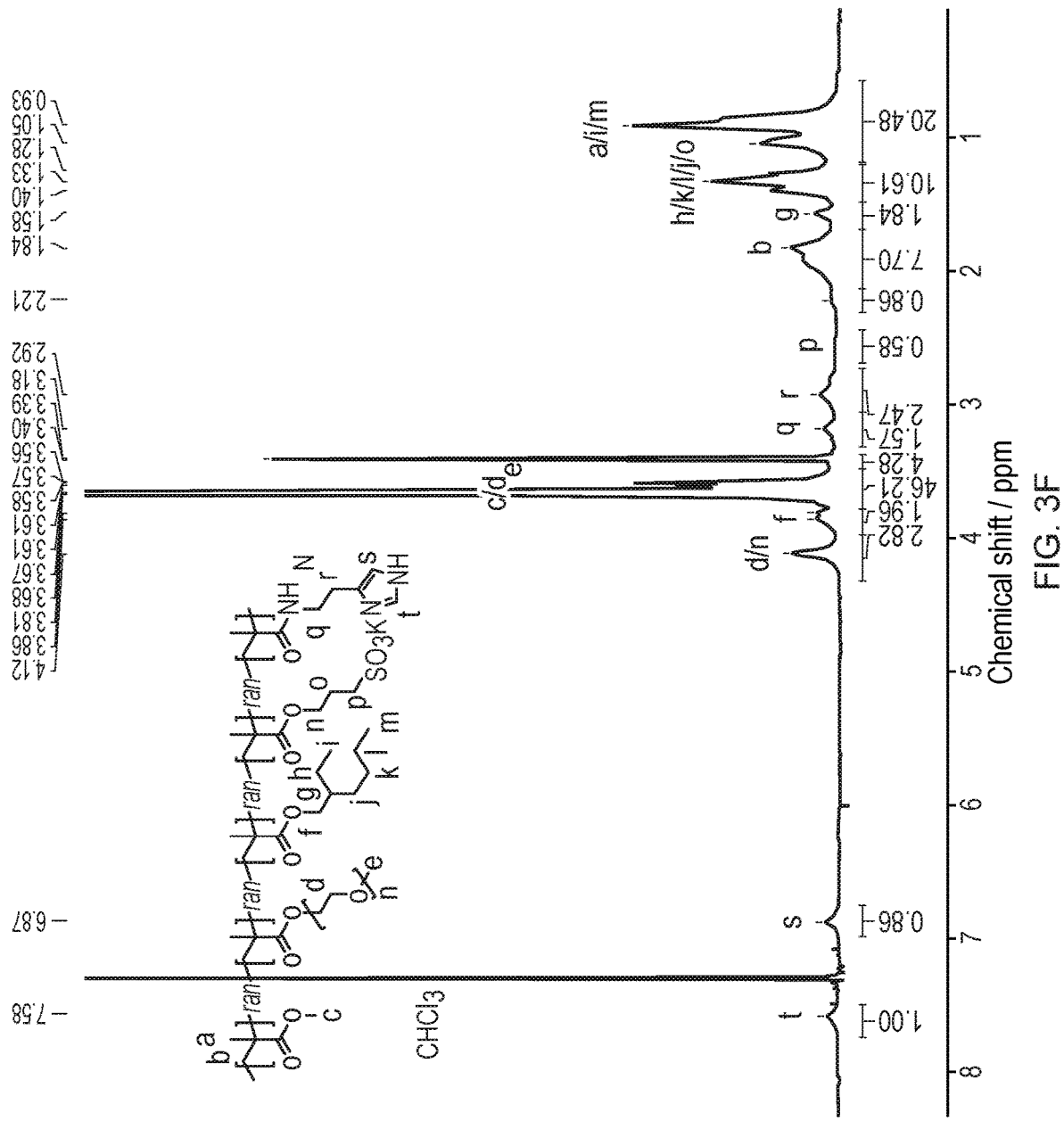
FIG. 3F is a $^1H$ NMR spectrum of RHP-H1 (500 MHZ, $CDCl_3$).
Figure 3G:
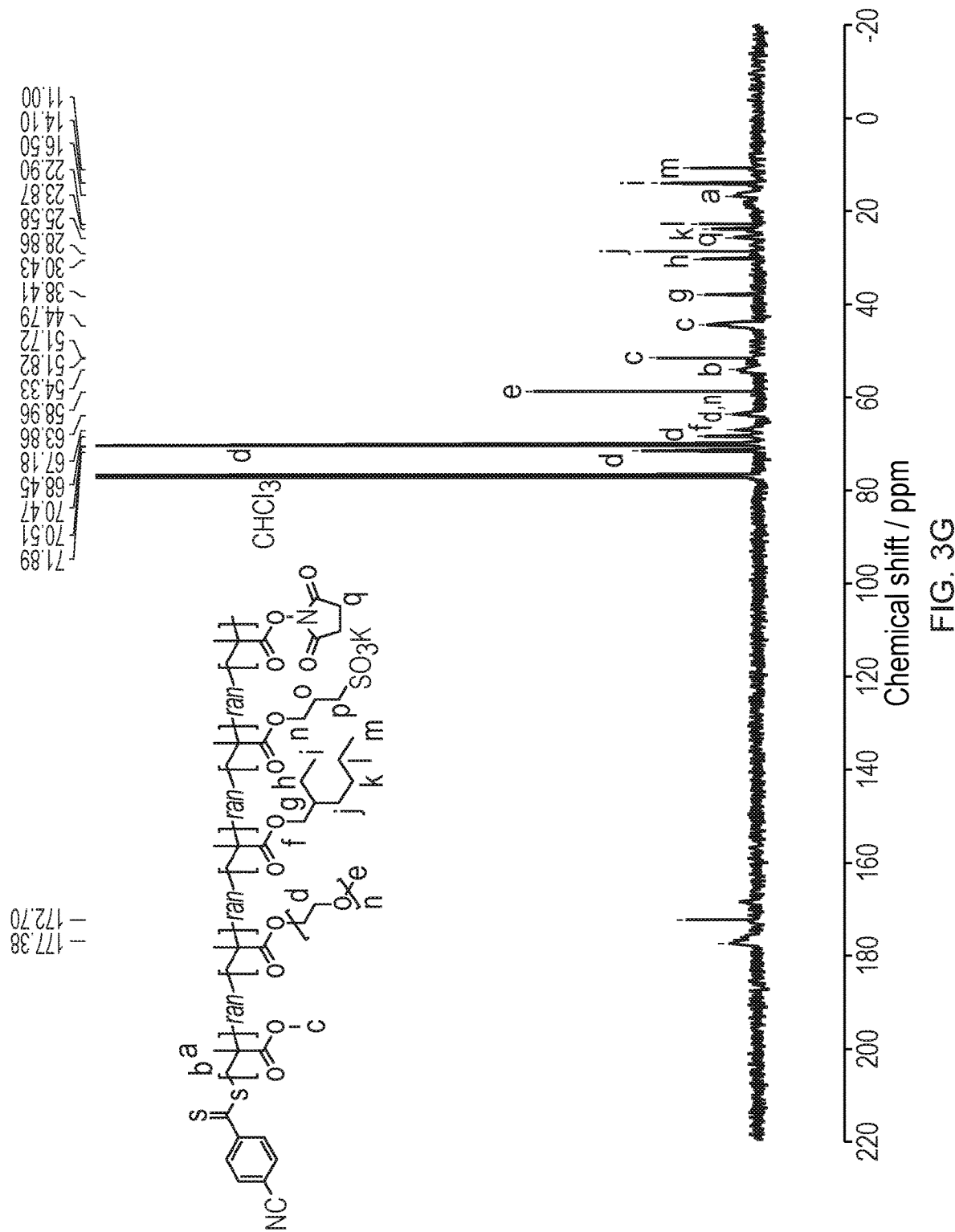
FIG. 3G is a $^{13}C$ NMR spectrum of RHP-N1 (150 MHz, $CDCl_3$).
Figure 3H:
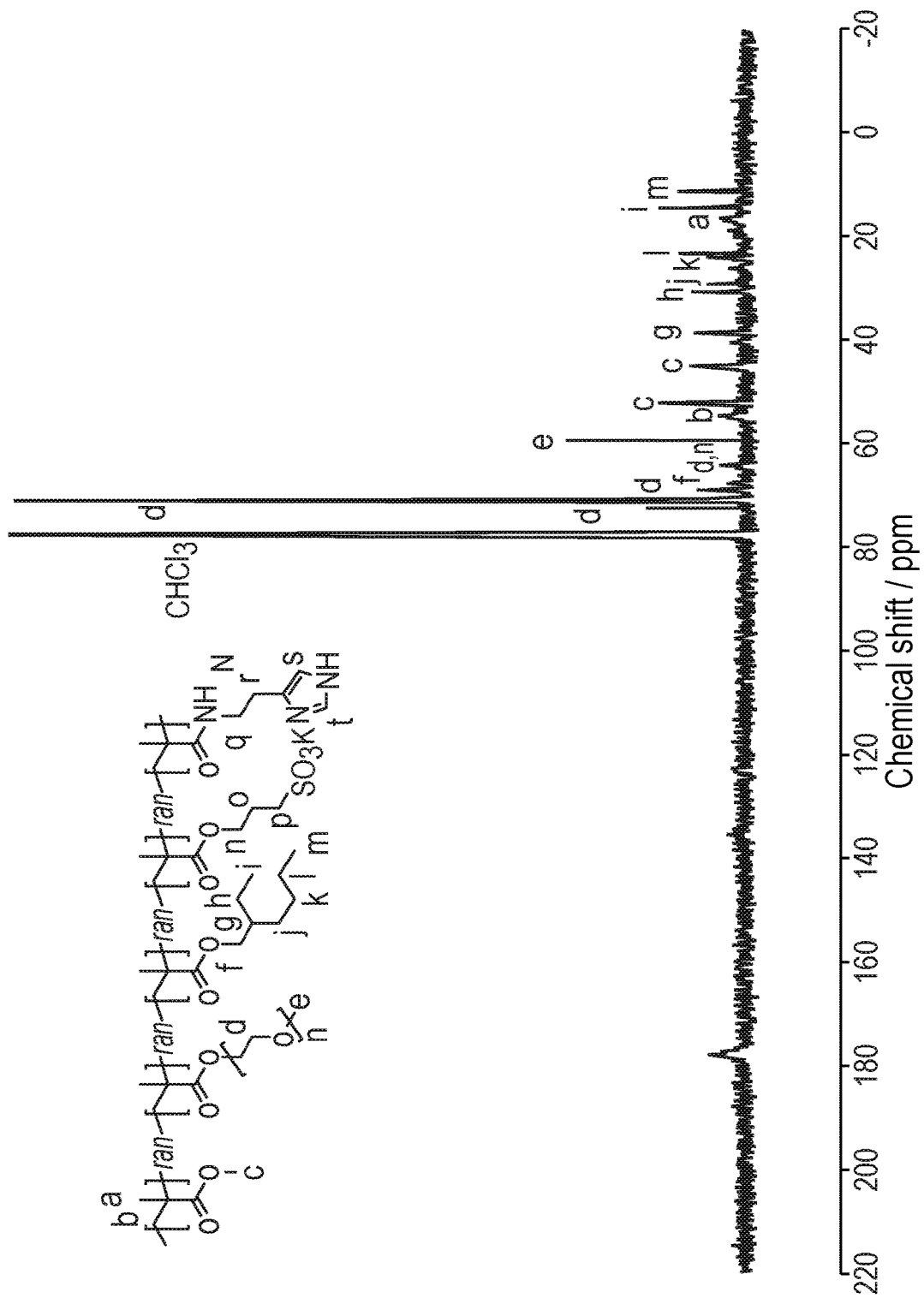
FIG. 3H is a $^{13}C$ NMR spectrum of RHP-H1 (150 MHz, $CDCl_3$).
Figure 3I:
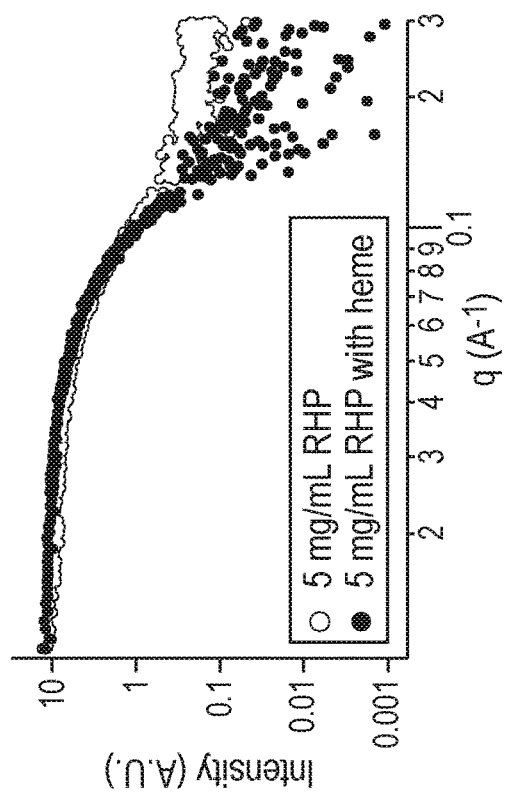
FIG. 3I depicts a small angle X-ray scattering of RHP-H1 in 25 mM PB pH 8 with 8% DMSO. Guinier analysis showed 5 mg/mL RHP-H1 had $R_g$=2.7 nm and 5 mg/mL RHP-H1 with heme had $R_g$=2.7 nm.
Figure 3J:
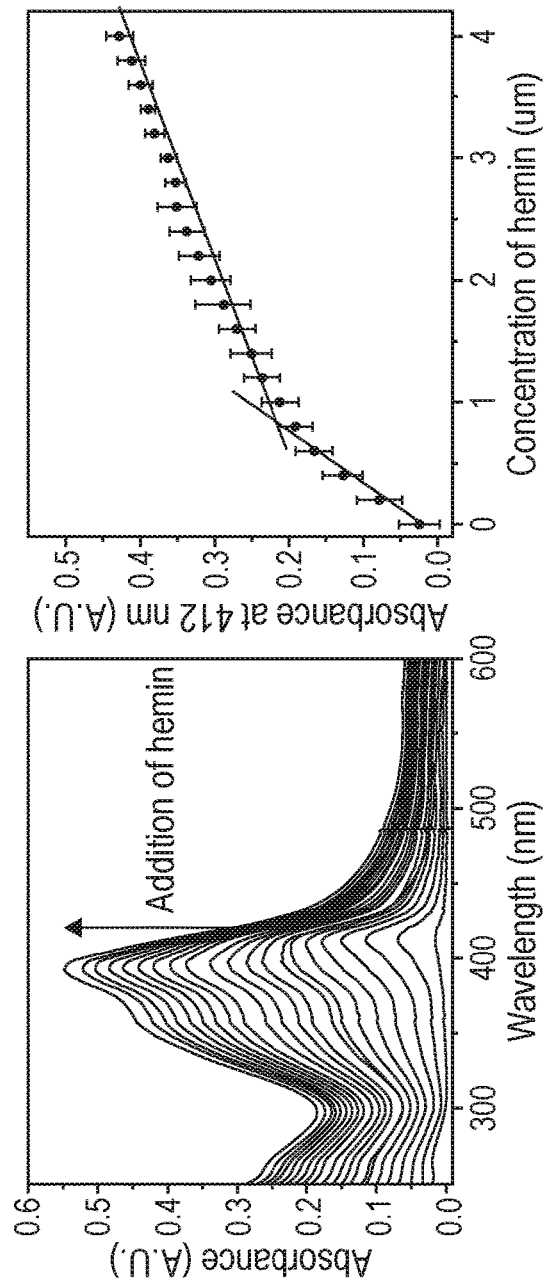
FIG. 3J shows the titration of heme (200 μM) into 0.8 UM RHP-H1. Error bar represents results from triplicate experiments.

Statistical analysis shows that the length of hydrophobic/philic segments in RHP-H1 is limited to 10 monomers, a trend seen in aqueous proteins. NMR characterization shows 10 histamine per chain (FIGS. 3E, 3F, 3G, and 3H) while GPC and sequence simulations show that the RHP chains are heterogeneous in length and composition. Heme titrations show a maximum of one bound heme per RHP chain (FIG. 3J). Thus, RHPs are present as single chains and do not oligomerize upon heme binding.

General Procedure for RHP Synthesis

RHPs were synthesized following the procedure from our previous study (Panganiban, B.; Qiao, B.; Jiang, T.; DelRe, C.; Obadia, M. M.; Nguyen, T. D.; Smith, A. A. A.; Hall, A.; Sit, I.; Crosby, M. G.; Dennis, P. B.; Drockenmuller, E.; Olvera de la Cruz, M.; Xu, T. Random Heteropolymers Preserve Protein Function in Foreign Environments. *Science* (1979) 2018, 359 (6381), 1239-1243). To an oven-dried Schlenk flask, monomers, initiator (AIBN), chain transfer agent, DMF, and Milli Q water (5%) were added. The reaction mixture underwent freeze-pump-thaw three times. The flask was then placed in an oil bath at 70 or 80° C. After given time, the reaction mixture was quenched by placing the flask into liquid nitrogen. The reaction mix was precipitated in pentane three times. After removing the supernatant, the bottom RHP layer was diluted with Milli Q water and transferred to a dialysis bag (MWCO=2k). The resultant polymer mixture was dialyzed against Milli Q water for 3 days and then was lyophilized. The final RHP was obtained as a pink or orange gel.

RHP-N1 Synthesis (RHP-H1 Precursor)

(MMA:OEGMA500:EHMA:SPMA:NHSMA=46:25:19:5:5): prepared according to the general polymerization procedure using MMA (0.5 mL), OEGMA500 (1.0 mL), EHMA (0.4 mL), NHSMA (128 mg), CTA (2-Cyano-2-propyl benzodithioate) (9.8 mg), AIBN (1.3 mg), and DMF (2.7 mL). The reaction was run at 80° C. for 2.5 h. The polymer was obtained as a maroon gel (Yield: 56%).

RHP-N2 Synthesis (RHP-H2 Precursor)

(MMA:OEGMA500:EHMA:SPMA:NHSMA=50:23:20:0:7): prepared according to the general polymerization procedure using MMA (0.5 mL), OEGMA500 (1.0 mL), EHMA (0.4 mL), NHSMA (128 mg), CTA (2-Cyano-2-propyl benzodithioate) (9.8 mg), AIBN (1.3 mg), and DMF (2.7 mL). The reaction was run at 80° C. for 2.5 h. The polymer was obtained as a purple gel (Yield: 51%).

RHP-N3 Synthesis (RHP-H3 Precursor)

(MMA:OEGMA500:EHMA:SPMA:NHSMA=35:23:35:0:7): prepared according to the general polymerization procedure using MMA (0.7 mL), OEGMA500 (2.1 mL), EHMA (1.5 mL), NHSMA (256 mg), CTA (2-Cyano-2-propyl benzodithioate) (9.8 mg), AIBN (1.3 mg), and DMF (2.7 mL). The reaction was run at 80° C. for 2.5 h. The polymer was obtained as a purple gel (Yield: 66%).

General Procedure of Post-Synthetic Modification

To an oven-dried round bottom flask, histamine (60 mg), RHP (200 mg), and dry DMSO (5 mL) were added. The reaction mixture was stirred at room temperature overnight. Then, additional histamine (20 mg) was added, and the reaction mixture was stirred at 50° C. for 4 h. The reaction mix was precipitated in petroleum ether. The bottom RHP layer was further diluted with Milli Q® water and transferred to a dialysis bag (MWCO=2k). The resultant polymer was dialyzed against Milli Q® water for 2 days and then was lyophilized. The final RHP was obtained as a yellow gel.

RHP-H1 Synthesis (MMA:OEGMA500:EHMA:SPMA:Histamine=46:25:19:5:5): prepared according to the general post-modification procedure using histamine (60 mg), RHP-N1 (200 mg), and dry DMSO (5 mL). The polymer was obtained as a yellow gel (Yield: 65%)

RHP-H2 Synthesis (MMA:OEGMA500:EHMA:SPMA:Histamine=50:23:20:0:7): prepared according to the general post-modification procedure using histamine (60 mg), RHP-N2 (200 mg), and dry DMSO (5 mL). The polymer was obtained as a yellow gel (Yield: 70%).

RHP-H3 Synthesis (MMA:OEGMA500:EHMA:SPMA:Histamine=35:23:35:0:7): prepared according to the general post-modification procedure using histamine (60 mg), RHP-N3 (200 mg), and dry DMSO (5 mL). The polymer was obtained as a yellow gel (Yield: 65%).

Small Angle X-Ray Scattering (SAXS)

Small angle X-ray scattering of RHP-H1 was carried out in buffer with 8% dimethyl sulfoxide. The results show an $R_g$ value of 2.7 nm and the Kratky plot is consistent with a compact chain, features that are unchanged by the addition of heme (FIG. 3I).

SAXS data was collected at the ALS beamline 7.3.3. Solutions of 5 mg/mL RHP-H1 in pH 8 25 mM phosphate buffer and 8% (v/v) DMSO with and without 1 equivalent heme were studied. RHP solutions were titrated with 5 mM or 3 mM solutions of heme in dimethyl sulfoxide. The solutions were filtered through 0.2 µm PTFE filters.

UV-Vis Absorption Spectroscopy

UV/Vis spectroscopy of RHP-heme was studied to probe the microenvironment of the heme cofactor. Solutions of 0.8 µM RHP in buffer were titrated with 200 µM heme in dimethyl sulfoxide and studied by UV/Vis spectroscopy. The results show a dissociation constant of $K_d=1.18\pm0.08$ µM for the RHP-H1 with SPMA and $K_d=0.33\pm0.05$ µM (n=3) for the more hydrophobic RHP-H2. RHP-heme UV/Vis spectrum shows a Soret band at 414 nm and Qα and Qβ bands at 570 nm and 537 nm. Variation in RHP $K_d$ values indicates heme microenvironment change with composition change while RHP-heme spectra show Soret and Q-bands consistent with bis-histamine heme ligation. RHP heme dissociation constants in the µM range are comparable to the µM values of de novo peptides from combinatorial libraries and greater than the nM values of de novo maquettes. RHP Soret and Q bands are similar to absorbance bands seen in H10H24 de novo maquettes and unlike the 435 nm Soret peak of imidazole (FIG. 3B). Therefore, RHP provides a hydrophobic microenvironment and side chain projection which makes it more similar to de novo peptides than imidazole.

UV-vis spectra were recorded on a Hewlett-Packard® 8453 spectrophotometer using a standard 1 cm path length quartz cuvette. For ABTS kinetic assay, absorbance at 700 nm was tracked using a Tecan Infinite® M Nano microplate reader in a 6 s interval.

Heme RHP Binding Isothermal

In all experiments, the titration was performed in 25 mM phosphate buffer (PH~8) containing 100 mM KCl, following our prior work (see Shu, J. Y., Tan, C., DeGrado, W. F. & Xu, T. New Design of Helix Bundle Peptide-Polymer Conjugates. *Biomacromolecules* 9, 2111-2117 (2008)). Titration experiments were done with 1 mL of ~0.8 µM solutions of RHP in quartz cuvettes. UV-vis spectra were recorded after addition of each 1 µL aliquot of a 200 µM hemin solution in DMSO. The dissociation constants, $K_d$ values, of heme binding sites were determined by monitoring the shift of the heme absorbance at 412 nm as a function of the concertation of heme (FIG. 3J). The binding isothermal was fitted using the equation showing below to determine $K_d$ values. The titration experiments were independently repeated three times to ensure reproducibility.

$$Abs_{412nm} = bg + \varepsilon_f xB + \frac{1}{2}(\varepsilon_b - \varepsilon_f)\left[(K_d + xB + B) \pm \sqrt{(K_d + xB + B)^2 - (4xB^2)}\right]$$

2,2'-Azino-Bis(3-Ethylbenzothiazoline-6-Sulfonic Acid (ABTS) Kinetic Study Assay Experiments were designed following methods reported by Hecht and coworkers (See Moffet, D. A. et al. Peroxidase activity in heme proteins derived from a designed combinatorial library J. Am. Chem. Soc. 122, 7612-7613 (2000)). In all experiments, measurements were done in 25 mM phosphate buffer (pH~8) containing 100 mM KCl while the initial concentrations of 2,2'-Azino-bis(3-ethylbenzothiazoline-6-sulfonic acid) diammonium salt (ABTS) and heme were 2.5 mM and 0.5 µM, respectively. The absorbance at 700 nm was monitored every 6 seconds in the initial 3 minutes reaction time. For control experiments using HRP and myoglobin, protein solutions were prepared and calibrated by UV-vis to ensure the concentration of heme around 0.5 µM.

Electron Paramagnetic Resonance (EPR)

Electron paramagnetic resonance spectroscopy was used to study angstrom scale arrangement of heme ligands. The results show that RHP-H1 and RHP-H2 RHP-heme complexes have uniform electronic structure with g-values (gx=1.538, gy=2.265, gz=2.94) and a rhombicity of V/Δ=0.565. The RHP-heme EPR rhombicity falls within the B group of heme EPR spectra, indicating bis-histamine ligation to low-spin Fe3+. EPR rhombicity places RHP-heme in a category with plant cytochrome b559 (V/Δ=0.57), bacterial nitrite reductase (V/Δ=0.59), de novo maquette H10H24 (V/Δ=0.60), and imidazole (V/Δ=0.54) (See Walker et al. *J. Am. Chem. Soc.* 1984, 106, 6888-6898). Comparison of RHP-heme to protein, peptide, and small molecule complexes indicates approximately parallel alignment of ring planes of the histamine ligands. Thus, the RHP microenvironment may be modulated independently of ligation and heme ligation is independent of RHP sequence heterogeneity. Despite sequence heterogeneity, RHP may provide a hydrophobic microenvironment tailored by composition with precisely positioned histamine side chains that have the axial ligation of natural electron transfer heme proteins and de novo designed peptide maquettes (FIG. 3C).

Samples of random heteropolymer were prepared at 0.4 mM random heteropolymer and 0.4 mM hemin chloride in pH 8 25 mM phosphate buffer with a maximum of 1% (v/v) dimethyl sulfoxide. Samples were flash frozen in liquid nitrogen. Spectra were measured on a Bruker® ELEXSYS E500 X-Band Continuous Wave Spectrometer equipped with an Oxford Instruments ESR900 cryostat. Typical parameters were 25 K temperature, 9 GHz microwave frequency, and 20 dB microwave power. Spectra were fit using EasySpin software.

Temperature-Dependent Catalytic Assay

RHP-heme peroxidase activity was assayed to study the function of microenvironment and side chain projection at the heme site. Single electron reduction of the intermediate by chromogenic substrates produces a spectroscopic signal to monitor peroxidase rate. RHP-heme was assayed in a pH 8 buffer solution of 5 µM RHP, 0.5 µM heme, 2.5 mM 2,2'-azino-di(3-ethyl-benzothiazoline-6-sulfonic acid) (ABTS), and variable hydroperoxide concentrations. RHP-H1 peroxidase turnover was $98\pm9$ min$^{-1}$ for hydrophobic cumene hydroperoxide and $3\pm0.2$ min$^{-1}$ for hydrophilic hydrogen peroxide (n=3). The more hydrophilic RHP-H2 turnover was $109\pm20$ min$^{-1}$ for cumene hydroperoxide and $5\pm0.1$ min 1 for hydrogen peroxide (n=3). RHP-heme activity depends on the microenvironment of a given RHP for binding affinity towards hydrogen peroxide or cumene hydroperoxide. For comparison, the enzyme myoglobin peroxidase turnover was $2\pm0.02$ min$^{-1}$ and 60,000 min$^{-1}$ for the enzyme horseradish peroxidase, with hydrogen peroxide as oxidant for the proteins (FIG. 3D). RHP was not evolved for peroxidase activity and had lower peroxidase activity than the highly evolved horseradish peroxidase, yet showed greater activity than myoglobin, which did not evolve to bind hydroperoxides. RHPs specifically bind hydrophobic substrates due to the hydrophobicity induced collapse of RHP chains. Positively charged arginine facilitates hydrogen peroxide binding in the horseradish peroxidase active site, however we expect active site presentation of charged side chains to counteract RHP hydrophobic collapse. RHP microenvironments are not highly evolved to bind substrates and lack the chemical diversity of enzyme active sites, yet RHP peroxidase activity is high due to specific histamine side chain projection in a hydrophobic microenvironment that can be evolved by RHP composition towards greater activity.

Samples were prepared with 10 µM RHP-H3, 10 µM hemin chloride (added from a dimethyl sulfoxide solution), and 10 mM ABTS in pH 8 25 mM phosphate buffer. Samples were heated in a water bath at set temperatures (40, 60, 80, 82° C.) for 10 minutes. Cumene hydroperoxide from a dimethyl sulfoxide solution was added to the sample to a final concentration of 10 mM to start the reaction. The sealed cuvette with a 1 mm path length was inverted to mix the solution. Spectra were collected on a Hewlett-Packard 8453 spectrophotometer every 30 seconds after the addition of the cumene hydroperoxide. Horseradish peroxidase samples were prepared with 20 nm M enzyme and 10 mM ABTS and heated for 10 minutes in a water bath. Then 10 mM $H_2O_2$ was added to start the reaction.

Temperature Cycling Experiment

RHP-heme peroxidase activity was assayed under conditions that commonly denature enzymes to explore RHP activity and study RHP-heme compatibility with material processing conditions. Interfacial denaturation is commonly seen in enzymes, limiting substrate concentration to avoid formation of hydrophobic substrate aggregates that denature enzymes. RHP-H3 composition MMA 34/OEGMA 22/EHMA 34/NHSMA 10 was studied for its higher hydrophobicity, which affects its tendency to aggregate. RHP-heme (RHP-H3) was assayed for peroxidase activity after heating in a water bath at variable temperature for 10 minutes. The results showed that RHP-heme peroxidase activity at 40° C. is 288±7% of its activity at 18° C. (n=3). RHP-heme activity at 60° C. is 219±26% and horseradish peroxidase activity at 60° C. is 35±20%, relative to their respective activities at 18° C. (n=3). Horseradish peroxidase activity decreased further with temperature (FIG. 4A).

To study the reversibility of RHP aggregation, heated RHP solutions were allowed to rest at room temperature. UV/Vis spectra showed background scattering from RHP-heme aggregates and, when allowed to cool at 18° C., recovered Soret and Q bands Samples were prepared with 10 µM RHP-H3, 10 µM hemin chloride (added from a dimethyl sulfoxide solution), and 2.5 mM ABTS in pH 8 25 mM phosphate buffer. Samples were heated to 80-90° C. in a water bath to induce aggregation and held at that temperature for 10 minutes. Samples were then transferred to a room temperature water bath (20° C.) for 10 minutes. The assay was started with the addition of cumene hydroperoxide from a dimethyl sulfoxide solution for a final concentration of 2.5 mM cumene hydroperoxide. Spectra were taken every 20 seconds after cumene hydroperoxide addition. Temperature cycles of RHP-heme from 80° C. to 20° C. were carried out, with 10 minutes at each temperature, then peroxidase activity assayed. The result showed that 78±3% of RHP-heme preaggregation peroxidase activity remained after 5 temperature cycles (n=3) (FIG. 4B).

Solutions of RHP-heme (RHP-H1) in 50 mM cumene hydroperoxide formed visible aggregates, which were studied to explore activity at the aqueous-organic interface. The aggregated solution with RHP-heme was red, consistent with a strong Soret band. After addition of ABTS to the aggregated solution, a blue color consistent with the oxidized product is seen (FIG. 4C). Thus, RHP-heme is active at aqueous-organic interfaces and its aggregated conformations may be reversible.

Electrospun Fiber Mats for Heterogeneous Catalysis

RHP-heme was coprocessed with polycaprolactone in organic solvent and electrospun into a fiber mat. Samples of RHP-H3 (0.2 wt %) and hemin chloride (1:1 random heteropolymer:hemin chloride) were co-dissolved with polycaprolactone (14 wt %) in 50:50 (v/v) dichloromethane:toluene. The mixture was electrospun from a 1 mL syringe fitted with a 20 gauge needle. The solution was dispensed at 0.46 mL/hr using a syringe pump oriented horizontally towards an aluminum collector plate placed 14 cm away from the needle tip. A voltage of 8 kV was applied to the solution. Scanning electron microscope images of the electrospun fibers were obtained on a Hitachi™-1000 microscope with a 10-kV accelerating voltage (FIG. 4D).

The resulting fiber mat had 7 µm diameter fibers and, when immersed in aqueous solution and assayed for peroxidase activity, showed 8.3±2.4% of the activity of RHP-heme in solution (n=3). The reduced activity of the fiber mat is attributed to encapsulation of RHP-heme within polycaprolactone fibers that slows diffusion of substrate and product. Nevertheless, RHPs are not deactivated by interfacial aggregation that limits activity of enzymes at high temperatures and those incorporated in materials. Similarly, RHPs are not limited in substrate concentration and are catalytically active in the presence of substrate aggregates.

Fiber mats containing RHP-H3 were prepared and electrospun as described above. A fiber mat of 68 mg and containing 1.2% (w/w) RHP-H3 was cut into three pieces (24 mg, 20 mg, 24 mg) and assayed in triplicate for peroxidase activity. The fiber mat activity was compared to RHP-H3 in solution activity. Solution samples were prepared with 5 µM random heteropolymer, 5 µM hemin chloride, and 2.5 mM ABTS in pH 8 25 mM phosphate buffer. Fiber mats were submerged into the solution for assay. The assay was started with the addition of cumene hydroperoxide from a dimethyl sulfoxide solution for a final concentration of 2.5 mM cumene hydroperoxide. Assay solution volume was adjusted so that the solution contained 5 µM random heteropolymer and 5 µM hemin chloride. Spectra were collected every 20 seconds after the reaction started by an aliquot transferred from the solution containing the fiber mat to a 10 mm path length. Spectra were collected on a Hewlett-Packard 8453 spectrophotometer.

Tetracycline Degradation Experiments

Prior work suggests that the phenol ring in tetracycline may be converted to quinone by RHP (Scheme 3).

Scheme 3 Proposed tetracycline degradation reaction.

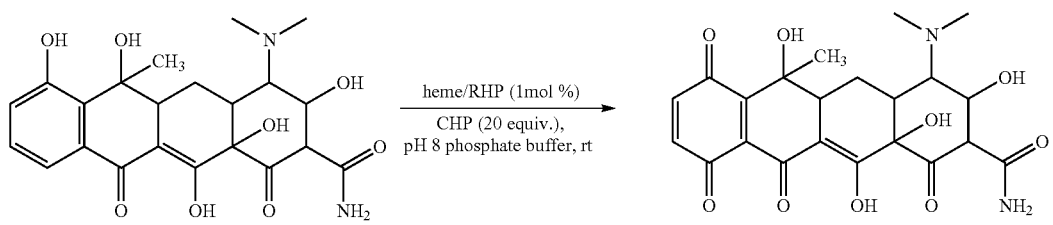

-continued

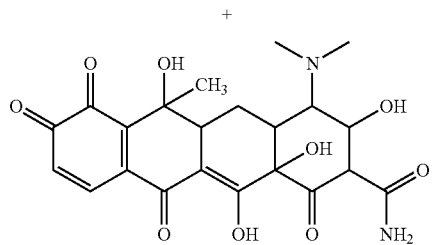

RHP-heme was assayed in 25 mM phosphate buffer (PH~8) containing 100 mM KCl with 0.02 µM RHP, 0.5 µM heme, 50 µM tetracycline (22 ppm), and 0.5 mM cumene hydroperoxide. Tetracycline is oxidized at an initial rate of 5 min$^{-1}$, monitored by the loss of the tetracycline aryl β-diketone chromophore that absorbs at 366 nm. Electronic transitions of the tetracycline substrate and possible products calculated by time-dependent density functional theory were consistent with the experimental tetracycline and product absorbances (FIG. 4E).

Olefin Polymerization

To further expand the catalytic capability of the RHP-heme system, the system was repurposed to implement unnatural chemistries by leveraging the Fe(II)/Fe(III) metalloredox radical chemistry. The RHP-heme may generate a tertiary radical via bromine atom-transfer from the substrate to the Fe(II) heme cofactor, and subsequently catalyze radical olefin polymerization. Under ambient temperature conditions, radical polymerization of OEGMA in an aqueous medium was effectively conducted using RHP-heme as the catalyst, with ethyl α-bromoisobutyrate as the radical polymerization initiator and ascorbic acid as the reducing agent for the conversion of heme Fe(III) to Fe(II) (FIG. 5A). In contrast, minimal polymerization was observed in the control reaction that lacks RHP. Additional kinetic investigations indicate that RHP-heme leads to a controlled, living polymerization, while natural enzymes including HRP and myoglobin generally show a poor control on the polymerization process (FIG. 5b).

Figure 5C:
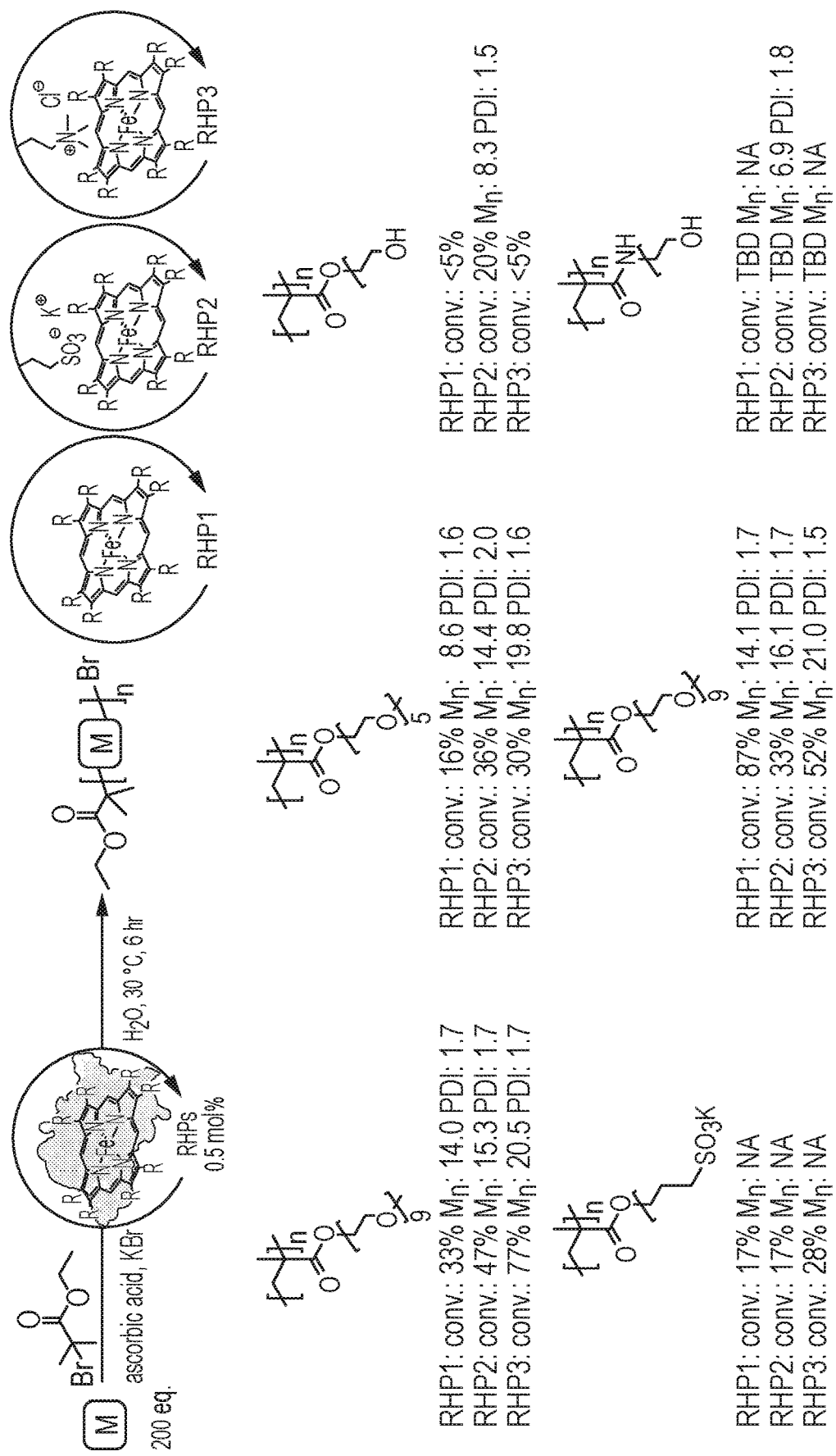
FIG. 5C describes a graph showing the monomer scope of polymerization catalyzed by heme-bound RHP.

Having optimized the conditions, the applicability of the RHP-heme system to polymerize a variety of monomers was tested (FIG. 5C). The polymerization of methyl acrylates and acrylates containing diverse side chain functionalities proceeded in moderate to good yields with broad functional group tolerance (amide, hydroxyl, and sulfonate).

To a 7 mL reaction vial, RHP solution (50 mg/mL in DI water, 1 mL), monomer (1 mmol, monomer/hemin=200:1), KBr (30 mg, 0.25 mmol), and hemin (0.005 mmol, 3.26 mg) were added and vortexed. The mixture was deoxygenated under N$_2$ for 30 mins. Then, ethyl α-bromoisobutyrate (0.73 µL, 0.005 mmol) and ascorbic acid (0.88 mg, 0.005 mmol) were added to the mixture under N$_2$. The mixture was then stirred and heated under N$_2$ at 30° C. Sample aliquots were taken periodically for NMR and GPC analysis. Before GPC analysis, the crude samples were lyophilized, re-dissolved in THF, and filtered through celite and alumina column, respectively.

TABLE 1

Summary of random heteropolymer compositions.
Monomer feeds shown in parentheses.

| Entry | MMA (%) | OEGMA (%) | EHMA (%) | SPMA (%) | NHSMA (%) | Yield (%) | Đ |
|---|---|---|---|---|---|---|---|
| RHP-S1 | 36 (50) | 28 (25) | 30 (20) | 6 (5) | — | 46 | 1.19 |
| RHP-S2 | 40 (50) | 8 (5) | 38 (30) | 14 (15) | — | 64 | 1.20 |
| RHP-H1 | 41 (46) | 22 (25) | 22 (19) | 5 (5) | 10 (5) | 51 | — |
| RHP-H2 | 38 (50) | 26 (23) | 23 (20) | — | 13 (7) | 56 | — |
| RHP-H3 | 24 (35) | 24 (23) | 42 (35) | — | 10 (7) | 66 | — |

Examples of the Above-Described Embodiments can Include the Following:

1. A composition of biomimetic catalyst molecules comprising:
   a mixture of heteropolymer sequences wherein a portion of the heteropolymers comprise a catalytically active region similar to that of a naturally occurring enzyme active site, wherein the catalytically active region catalyzes a reaction of a substrate in a manner functionally similar to that of a naturally occurring enzyme; and
   wherein the portion of heteropolymers comprises a 3-dimensional configuration that mimics physicochemical properties of naturally occurring enzymes.

2. The composition of claim 1, wherein the physicochemical properties comprises secondary structure, tertiary structure, surface structure, surface hydrophobicity, active site structure, and molecular weight, of a naturally occurring enzyme.

3. The composition of claim 1 or claim 2, wherein the heteropolymer sequence comprise monomers, the monomers comprising methyl methacrylate (MMA), 2-ethylhexyl methacrylate (2-EHMA), oligo (ethylene glycol) methyl ether methacrylate (OEGMA), or 3-sulfopropyl methacrylate potassium salt (SPMA).

4. The composition of any of claims 1 to 3, further comprising styrene (STY) as one of the monomers.

5. The composition any of claims 1 to 4, further comprising methacrylic acid N-hydroxysuccinimide ester (NHSMA) as one of the monomers.

6. The composition of claim 5, wherein catalytically active region binds heme.

7. The composition of any of claims 1 to 6, comprising:
   (a) about 50% to about 80% hydrophobic monomers;
   (b) about 15% to about 40% charged or polar monomers; and (c) about 0.01% to about 20% catalytically active region monomers.

8. The composition of any of claims 1 to 7, comprising:
(a) about 40% to about 60% MMA;
(b) about 0.01% to about 30% OEGMA;
(c) about 5% to about 40% EHMA;
(d) about 0.01% to about 25% SPM; and
(e) about 0.01% to about 15% STY.

9. The composition of any of claims 1 to 7, comprising:
(a) about 25% to about 60% MMA;
(b) about 10% to about 35% OEGMA;
(c) about 10% to about 45% EHMA;
(d) about 0.01% to about 10% SPMA; and
(e) about 0.01% to about 15% NHSMA.

10. A biomimetic catalyst molecule comprising:
a heteropolymer sequence comprising a catalytically active region similar to that of a naturally occurring enzyme active site, wherein the catalytically active region catalyzes a reaction of a substrate in a manner functionally similar to that of a naturally occurring enzyme; and
wherein the sequence comprises a 3-dimensional configuration of a naturally occurring protein structure.

11. A method of catalyzing a reaction comprising:
(a) providing the biomimetic catalyst of claim 1;
(b) incorporating a substrate; and
(c) catalyzing a reaction.

12. The method of claim 11, wherein catalysis of a reaction occurs at a temperature of about 40° C. to about 80° C.

13. The method of claim 11 or claim 12, wherein catalysis of a reaction occurs after high temperature exposure of at least about 80° C.

14. The method of any of claims 11 to 13, wherein catalysis of a reaction occurs in the presence of substrate aggregates.

15. The method of any of claims 11 to 14, wherein catalysis of a reaction occurs at the interface of aqueous and organic solutions.

16. The method of claim 11, wherein the reaction comprises terpene cyclization.

17. The method of claim 11, wherein the reaction comprises peroxide reduction.

18. The method of claim 11, wherein the reaction comprises tetracycline oxidation.

19. The method of claim 11, wherein the reaction comprises radical olefin polymerization.

20. A method of making heteropolymeric molecules comprising:
(a) collecting sequence simulation inputs;
(b) designing a set of candidate heteropolymer sequences, based on the sequence simulation inputs;
(c) determining whether the candidate heteropolymers comprise a 3-dimensional structure capable of binding a substrate or cofactor; and
(d) performing controlled synthesis of the candidate heteropolymers;
wherein the sequence simulation inputs comprise monomer reactivity data; and
wherein the controlled synthesis comprises controlling monomer feeding ratio, degree of polymerization, solvents used, temperature and chain transfer agents.

The present disclosure enables one of skill in the relevant art to make and use the inventions provided herein in accordance with multiple and varied embodiments. Various alterations, modifications, and improvements of the present disclosure that readily occur to those skilled in the art, including certain alterations, modifications, substitutions, and improvements are also part of this disclosure. Accordingly, the foregoing description are by way of example to illustrate the discoveries provided herein. Furthermore, the foregoing Description and Examples are exemplary of the present invention and not limiting thereof. The scope of the invention is therefore set out in the appended claims.

Although specific embodiments of the present disclosure are herein illustrated and described in detail, the disclosure is not limited thereto. The above detailed descriptions are provided as exemplary of the present disclosure and should not be construed as constituting any limitation of the disclosure. Modifications will be obvious to those skilled in the art, and all modifications that do not depart from the spirit of the disclosure are intended to be included with the scope of the appended claims.

The invention claimed is:

1. A composition of biomimetic catalyst molecules comprising:
a mixture of heteropolymer sequences wherein a portion of the heteropolymers comprise a catalytically active region similar to that of a naturally occurring enzyme active site, wherein the catalytically active region catalyzes a reaction of a substrate in a manner functionally similar to that of a naturally occurring enzyme; and
wherein the portion of heteropolymers comprises a 3-dimensional configuration that mimics physicochemical properties of naturally occurring enzymes.

2. The composition of claim 1, wherein the physicochemical properties comprise secondary structure, tertiary structure, surface structure, surface hydrophobicity, active site structure, and molecular weight, of a naturally occurring enzyme.

3. The composition of claim 1, wherein the heteropolymer sequence comprises monomers, the monomers comprising methyl methacrylate (MMA), 2-ethylhexyl methacrylate (2-EHMA), oligo (ethylene glycol) methyl ether methacrylate (OEGMA), or 3-sulfopropyl methacrylate potassium salt (SPMA).

4. The composition of claim 3, further comprising styrene (STY) as one of the monomers.

5. The composition of claim 4, further comprising methacrylic acid N-hydroxysuccinimide ester (NHSMA) as one of the monomers.

6. The composition of claim 5, wherein catalytically active region binds heme.

7. The composition of claim 1, comprising:
(a) about 50% to about 80% hydrophobic monomers;
(b) about 15% to about 40% charged or polar monomers; and
(c) about 0.01% to about 20% catalytically active region monomers.

8. The composition of claim 1, comprising:
(a) about 40% to about 60% MMA;
(b) about 0.01% to about 30% OEGMA;
(c) about 5% to about 40% EHMA;
(d) about 0.01% to about 25% SPM; and
(e) about 0.01% to about 15% STY.

9. The composition of claim 1, comprising:
(a) about 25% to about 60% MMA;
(b) about 10% to about 35% OEGMA;
(c) about 10% to about 45% EHMA;
(d) about 0.01% to about 10% SPMA; and
(e) about 0.01% to about 15% NHSMA.

10. A biomimetic catalyst molecule comprising:
a heteropolymer sequence comprising a catalytically active region similar to that of a naturally occurring enzyme active site, wherein the catalytically active region catalyzes a reaction of a substrate in a manner functionally similar to that of a naturally occurring enzyme; and wherein the sequence comprises a 3-dimensional configuration of a naturally occurring protein structure.

11. A method of catalyzing a reaction comprising:
(a) providing the biomimetic catalyst of claim 1;
(b) incorporating a substrate; and
(c) catalyzing a reaction.

12. The method of claim 11, wherein catalysis of a reaction occurs at a temperature of about 40° C. to about 80° C.

13. The method of claim 11, wherein catalysis of a reaction occurs after high temperature exposure of at least about 80° C.

14. The method of claim 11, wherein catalysis of a reaction occurs in the presence of substrate aggregates.

15. The method of claim 11, wherein catalysis of a reaction occurs at the interface of aqueous and organic solutions.

16. The method of claim 11, wherein the reaction comprises terpene cyclization.

17. The method of claim 11, wherein the reaction comprises peroxide reduction.

18. The method of claim 11, wherein the reaction comprises tetracycline oxidation.

19. The method of claim 11, wherein the reaction comprises radical olefin polymerization.

* * * * *